US012784990B2

(12) United States Patent
Sasaki et al.

(10) Patent No.: US 12,784,990 B2
(45) Date of Patent: Nov. 3, 2026

(54) ELECTRONIC COMPONENT

(71) Applicant: TDK Corporation, Tokyo (JP)

(72) Inventors: Shogo Sasaki, Tokyo (JP); Kazuhiro Okada, Tokyo (JP); Keiichi Takizawa, Tokyo (JP); Yoshitaka Nagashima, Tokyo (JP)

(73) Assignee: TDK CORPORATION, Tokyo (JP)

( * ) Notice: Subject to any disclaimer, the term of this patent is extended or adjusted under 35 U.S.C. 154(b) by 141 days.

(21) Appl. No.: 19/007,983

(22) Filed: Jan. 2, 2025

(65) Prior Publication Data

US 2025/0259795 A1 Aug. 14, 2025

(30) Foreign Application Priority Data

Feb. 8, 2024 (JP) ................................. 2024-017920

(51) Int. Cl.
*H01G 4/30* (2006.01)
*H01G 4/012* (2006.01)

(52) U.S. Cl.
CPC ............... *H01G 4/30* (2013.01); *H01G 4/012* (2013.01)

(58) Field of Classification Search
CPC ................................ H01G 4/30; H01G 4/012
See application file for complete search history.

(56) References Cited

U.S. PATENT DOCUMENTS

| | | | | |
|---|---|---|---|---|
| 9,853,619 | B2 * | 12/2017 | Sato | H01G 4/232 |
| 2012/0262837 | A1 * | 10/2012 | Hoshi | H01G 4/005 361/301.4 |
| 2015/0294792 | A1 * | 10/2015 | Schossmann | B32B 15/04 156/290 |
| 2018/0012706 | A1 * | 1/2018 | Bultitude | H01G 4/33 |
| 2019/0006107 | A1 * | 1/2019 | Kim | H01G 4/012 |
| 2019/0304696 | A1 * | 10/2019 | Kim | H01G 4/12 |
| 2020/0152389 | A1 * | 5/2020 | Kim | H01G 4/012 |
| 2020/0265998 | A1 * | 8/2020 | Kwon | H01G 4/12 |

FOREIGN PATENT DOCUMENTS

JP 2000-124064 A 4/2000

* cited by examiner

*Primary Examiner* — Michael P McFadden
(74) *Attorney, Agent, or Firm* — Oliff PLC

(57) ABSTRACT

An electronic component includes, a first internal electrode disposed in the element body and connected to the first terminal electrode, a second internal electrode disposed in the element body and connected to the second terminal electrode, a dissimilar material layer disposed in the element body and containing a material different from the element body, in which the first internal electrode and the second internal electrode are opposite to each other in a second direction perpendicular to the first direction with the dissimilar material layer interposed between the first internal electrode and the second internal electrode, the dissimilar material layer has a linear expansion coefficient greater than a linear expansion coefficient of the element body, the first internal electrode and the second internal electrode include corner portions positioned in the element body, and the dissimilar material layer is not overlapped with the corner portions as viewed from the second direction.

14 Claims, 19 Drawing Sheets

*Fig.17*

■ VOLTAGE CAUSING GENERATION OF ELECTROSTRICTIVE CRACKS

| | COMPARATIVE EXAMPLE 1 | COMPARATIVE EXAMPLE 2 | EXAMPLE |
|---|---|---|---|
| AVERAGE VALUE | 395.4 | 454.0 | 457.5 |
| STANDARD DEVIATION | 24.5 | 28.1 | 25.1 |

ELECTRONIC COMPONENT

CROSS-REFERENCE TO RELATED APPLICATIONS

This application is based upon and claims the benefit of priority from Japanese Patent Application No. 2024-017920, filed on Feb. 8, 2024, the entire contents of which are incorporated herein by reference.

TECHNICAL FIELD

The present disclosure relates to an electronic component.

BACKGROUND

An electronic component including an element body having a pair of end surfaces opposite to each other, a pair of terminal electrodes disposed on the pair of end surfaces, and an internal electrode connected to each of the terminal electrodes is known (see, for example, Japanese Unexamined Patent Publication No. 2000-124064).

SUMMARY

Here, in the electronic component as described above, when a voltage is applied, a volume change due to electrostriction occurs at a position where the internal electrodes are overlapped with each other, and cracks may occur in a side gap section. In order to reduce such electrostrictive cracks, a method of increasing the volume of the internal electrode is employed, but there is a problem that deterioration occurs due to a high-temperature load when a dielectric layer is subjected to thinning and multilayering in order to increase the volume. In addition, by taking a countermeasure for the cracks due to electrostriction, a stress at a corner portion of the internal electrode may increase.

Therefore, an object of the present disclosure is to provide an electronic component capable of reducing electrostrictive cracks and relaxing a stress at a corner portion of an internal electrode.

An electronic component includes an element body including a pair of end surfaces opposite to each other in a first direction, a first terminal electrode disposed on one side of the pair of end surfaces in the first direction, a second terminal electrode disposed another side of the pair of end surfaces in the first direction, a first internal electrode disposed in the element body and connected to the first terminal electrode, a second internal electrode disposed in the element body and connected to the second terminal electrode, a dissimilar material layer disposed in the element body and containing a material different from the element body, in which the first internal electrode and the second internal electrode are opposite to each other in a second direction perpendicular to the first direction with the dissimilar material layer interposed between the first internal electrode and the second internal electrode, the dissimilar material layer has a linear expansion coefficient greater than a linear expansion coefficient of the element body, the first internal electrode and the second internal electrode include corner portions positioned in the element body, and the dissimilar material layer is not overlapped with the corner portions as viewed from the second direction.

In the electronic component, the first internal electrode and the second internal electrode are opposite to each other in the second direction, with the dissimilar material layer containing a material different from that of the element body interposed therebetween. In this manner, since the dissimilar material layer is additionally provided to be overlapped with the internal electrodes, the volume of the member having the linear expansion coefficient greater than that of the element body is increased, so that the compressive stress can be introduced into a side gap section between the internal electrodes and a side surface of the element body. As a result, even though electrostrictive vibration occurs when a voltage is applied, the generation of electrostrictive cracks can be minimized by reducing a tensile stress at the central portion of the side gap section in the second direction. In addition, unlike the thinning and multilayering of the dielectric layers, it is possible to reduce electrostrictive cracks while reducing deterioration due to a high-temperature load. Here, as viewed from the second direction, the dissimilar material layer is not overlapped with the corner portion of the internal electrodes. Therefore, it is possible to relax the stress at the corner portion of the outermost internal electrodes. As described above, it is possible to reduce the electrostrictive cracks and relax the stress at the corner portion of the internal electrodes.

The element body may contain a ceramic material, and the dissimilar material layer may include a metal layer. In this case, a linear expansion coefficient of the dissimilar material layer can be higher than that of the element body.

In the region where the first internal electrode and the second internal electrode are overlapped with each other in the second direction, when the dimension in the third direction perpendicular to the first direction and the second direction is denoted by W, the dimension in the third direction of the region overlapped with no dissimilar material layer in the corner portion may be W/10 or more and W/3 or less. In this case, the region of the corner portion overlapped with no dissimilar material layer can be sufficiently secured, and the compressive stress can be sufficiently introduced into the side gap section by restricting the excessive widening of the region.

In the region where the first internal electrode and the second internal electrode are overlapped with each other in the second direction, when the dimension in the first direction is denoted by L, the dimension in the first direction of the region overlapped with no dissimilar material layer in the corner portion may be L/10 or more and L/3 or less. In this case, the region of the corner portion overlapped with no dissimilar material layer can be sufficiently secured, and the compressive stress can be sufficiently introduced into the side gap section by restricting the excessive widening of the region.

The dissimilar material layer may have the notched portions at the positions corresponding to the corner portions, and each notched portion may be shaped to be away from each corner portion toward the inner peripheral side as viewed from the second direction. Since the distance between the corner portion of the internal electrodes and an edge portion of the notched portion of the dissimilar material layer can be increased, the stress at the corner portion of the internal electrodes can be relaxed.

The dissimilar material layer may have the notched portions at the positions corresponding to the corner portions, and each notched portion may have a curved portion that is curved as viewed from the second direction. In this case, the electric field concentration on the notched portion can be alleviated.

As viewed from the second direction, the curved portion may be curved in such a manner as to be away from the corner portion toward the inner peripheral side. In this case, since the distance between the corner portion of the internal electrodes and the edge portion of the notched portion of the dissimilar material layer can be increased, the stress at the corner portion of the internal electrodes can be relaxed.

The corner portion may have a shape protruding toward the outer peripheral side. In this case, the electric field concentration on the corner portion can be alleviated.

The thickness of the dissimilar material layer may be greater than the thicknesses of the first internal electrode and the second internal electrode. In this case, the thickness of the dissimilar material layer can be increased to increase the breakdown voltage.

The thickness of the dissimilar material layer may be 1.3 times or more the thicknesses of the first internal electrode and the second internal electrode. In this case, the thickness of the dissimilar material layer can be sufficiently increased to increase the breakdown voltage.

The edge portion by the outer peripheral side of the dissimilar material may be thicker than the region on the inner peripheral side. In this case, the expansion of the element body can be reduced by thinning the region on the inner peripheral side.

The thickness of the edge portion may be 1.3 times or more the thickness of the region on the inner peripheral side. In this case, the expansion of the element body can be reduced by sufficiently thinning the region on the inner peripheral side.

When a direction perpendicular to the first direction and the second direction is a third direction, the dissimilar material layer may have a smaller width in at least one direction of the first direction or the third direction than those of the first internal electrode and the second internal electrode, and may be disposed on an end portion side of the first internal electrode and the second internal electrode in the one direction as viewed from the second direction. In this case, since the internal electrodes are not overlapped with the dissimilar material layer in the vicinity of the center, it is possible to reduce the expansion of the element body.

An electronic component includes an element body including a pair of end surfaces opposite to each other in a first direction, a first terminal electrode disposed on one side of the pair of end surfaces in the first direction, a second terminal electrode disposed another side of the pair of end surfaces in the first direction, a first internal electrode disposed in the element body and connected to the first terminal electrode, a second internal electrode disposed in the element body and connected to the second terminal electrode, a compressive stress introduction layer disposed in the element body and configured to introduce a compressive stress into the element body, in which the first internal electrode and the second internal electrode are opposite to each other in a second direction perpendicular to the first direction with the compressive stress introduction layer interposed between the first internal electrode and the second internal electrode, the compressive stress introduction layer is configured to introduce the compressive stress into a side gap section between the first internal electrode and the second internal electrode, and a side surface of the element body in a third direction perpendicular to the first direction and the second direction, the first internal electrode and the second internal electrode include corner portions positioned in the element body, and the compressive stress introduction layer is not overlapped with the corner portions as viewed from the second direction.

In the electronic component, the first internal electrode and the second internal electrode are opposite to each other in the second direction, with the compressive stress introduction layer that introduces compressive stress into the element body interposed therebetween. The compressive stress introduction layer can introduce a compressive stress into a side gap section between the first internal electrode and the second internal electrode, and the side surface of the element body in the third direction. As a result, even though electrostrictive vibration occurs when a voltage is applied, the generation of electrostrictive cracks can be minimized by reducing a tensile stress at the central portion of the side gap section in the second direction. In addition, unlike the thinning and multilayering of the dielectric layers, it is possible to reduce electrostrictive cracks while reducing deterioration due to a high-temperature load. Here, as viewed from the second direction, the compressive stress introduction layer is not overlapped with the corner portion of the internal electrodes. Therefore, it is possible to relax the stress at the corner portion of the outermost internal electrodes. As described above, it is possible to reduce the electrostrictive cracks and relax the stress at the corner portion of the internal electrodes.

According to the present disclosure, it is possible to provide the electronic component capable of reducing electrostrictive cracks and relaxing the stress at the corner portion of the internal electrodes.

BRIEF DESCRIPTION OF THE DRAWINGS

FIG. 17 is a table illustrating the experimental result;

DETAILED DESCRIPTION

Figure 1:
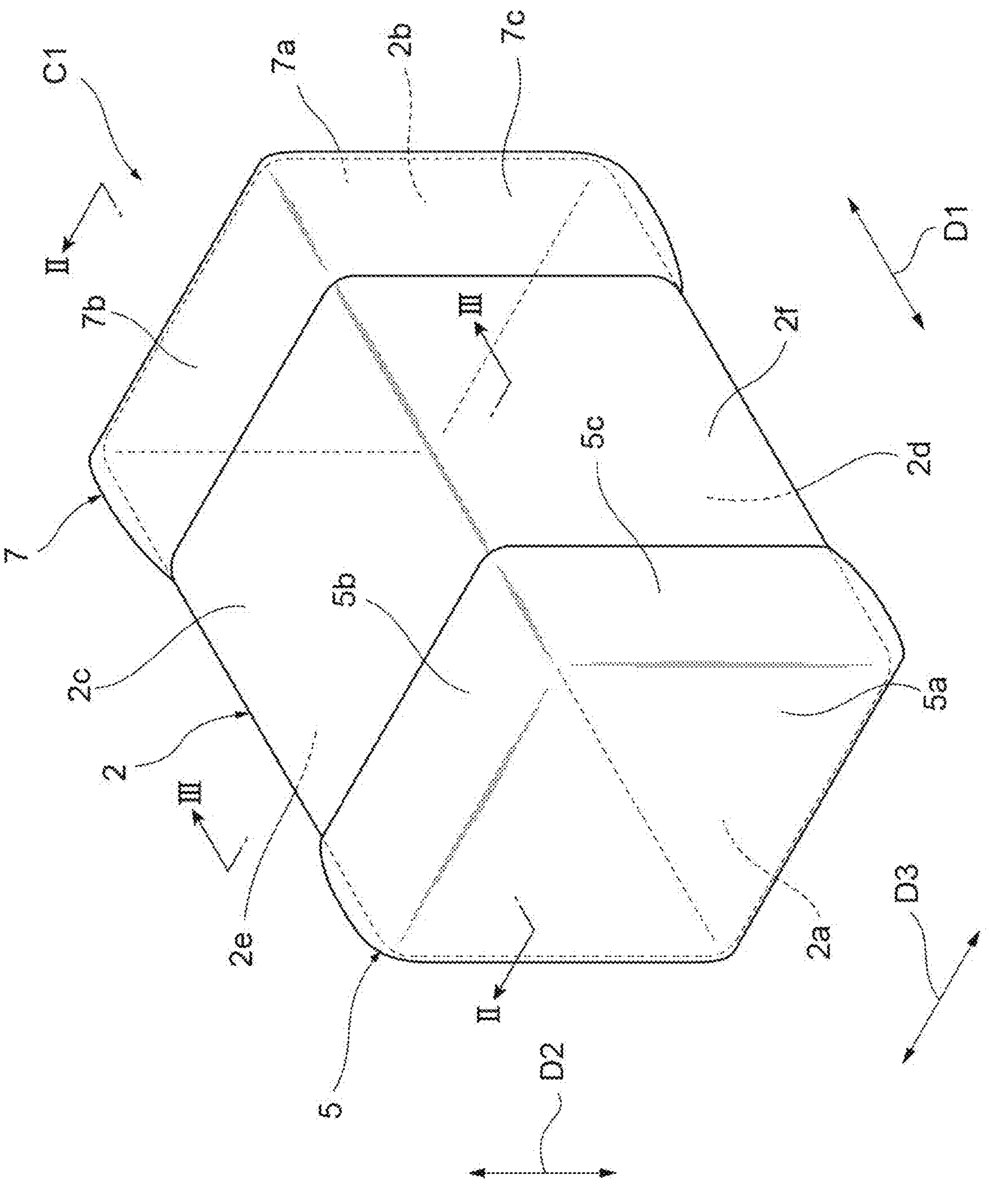
FIG. 1 is a perspective view illustrating an electronic component according to an embodiment of the present disclosure.

Hereinafter, embodiments of the present disclosure will be described in detail with reference to the accompanying drawings. Note that in the description, the same reference numerals will be used for the same elements or elements having the same function, and redundant description will be omitted.

Figure 2:
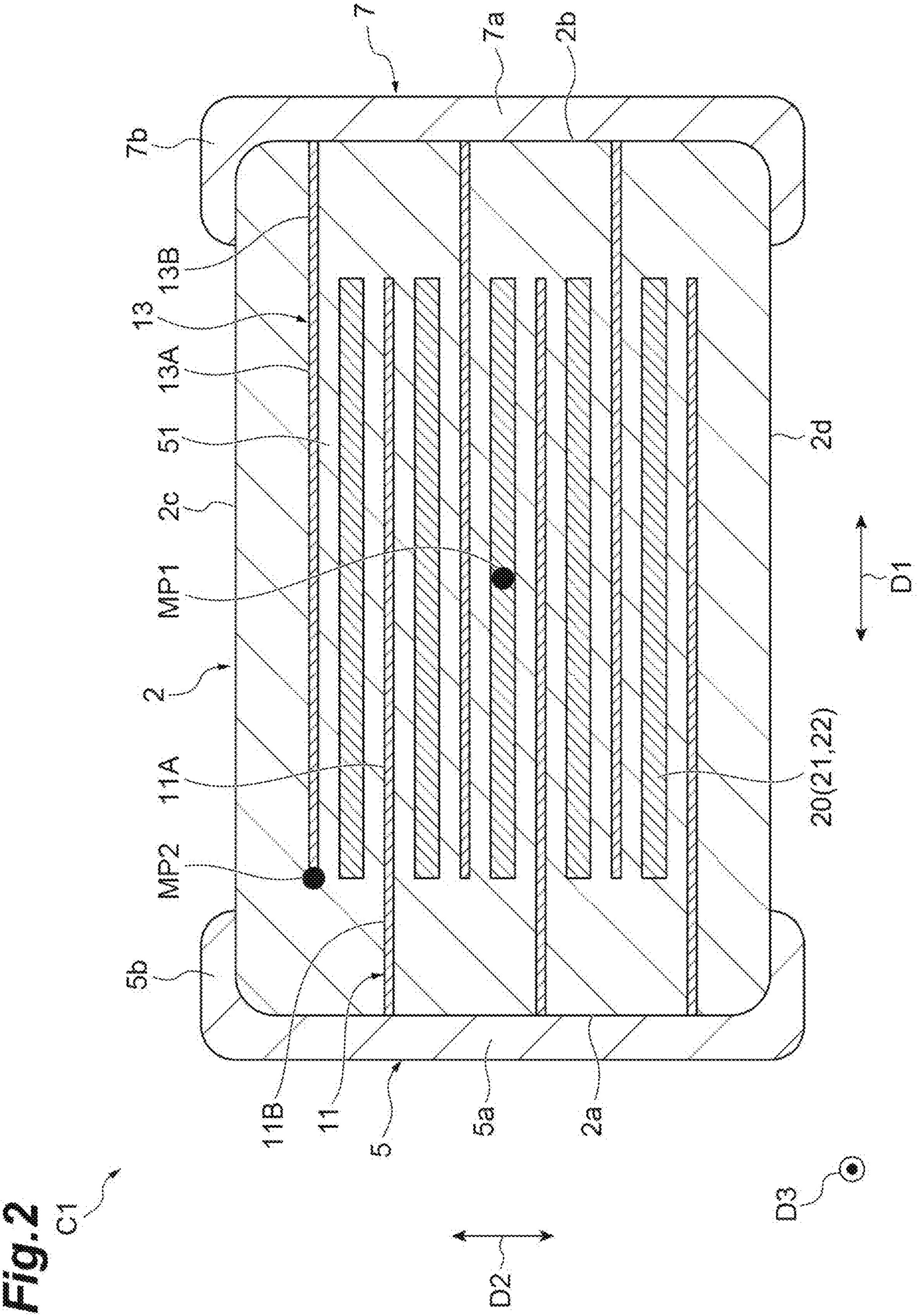
FIG. 2 is a cross-sectional view taken along line II-II illustrated in FIG. 1.
Figure 3:
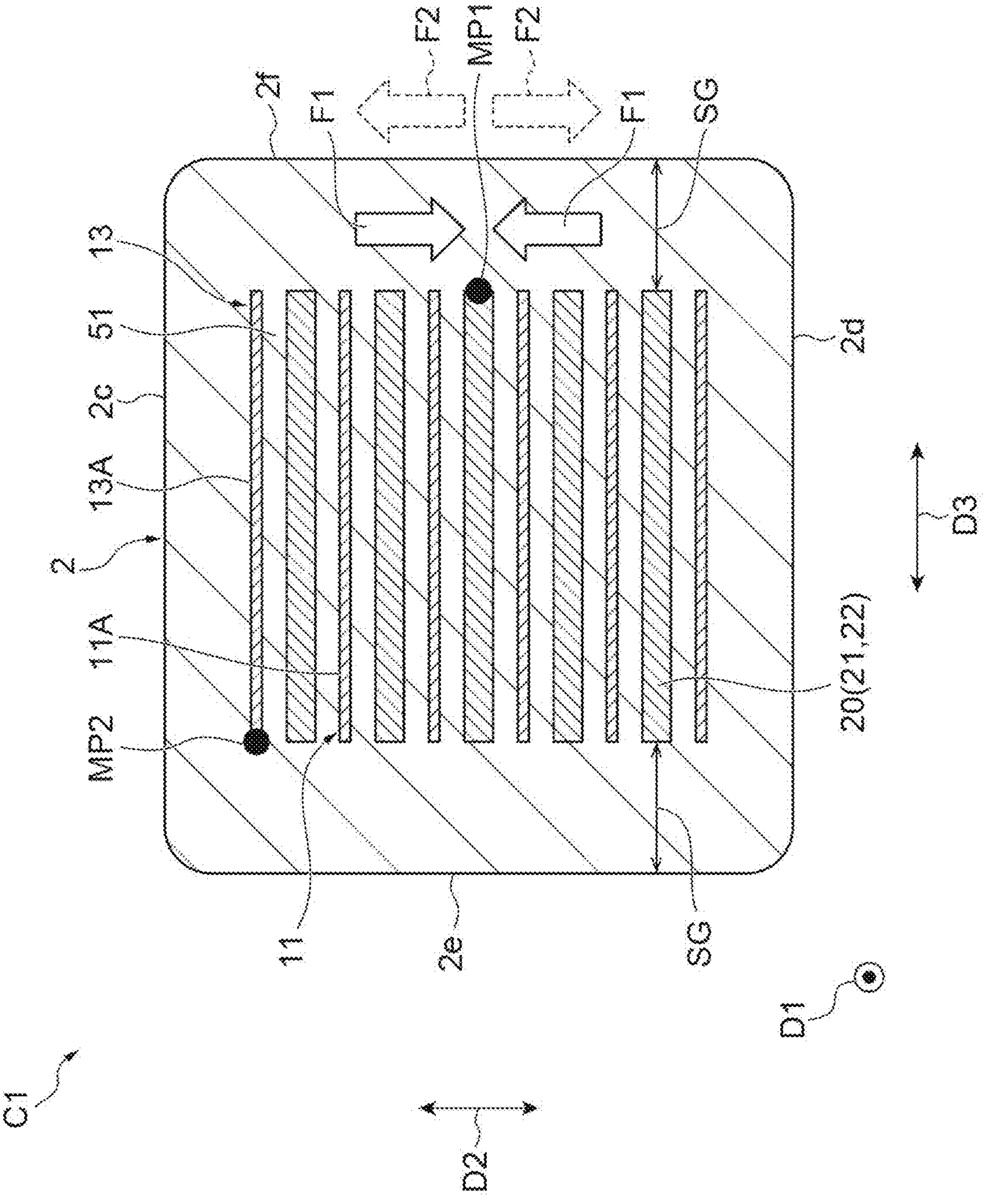
FIG. 3 is a cross-sectional view taken along line III-III illustrated in FIG. 1.
Figure 4:
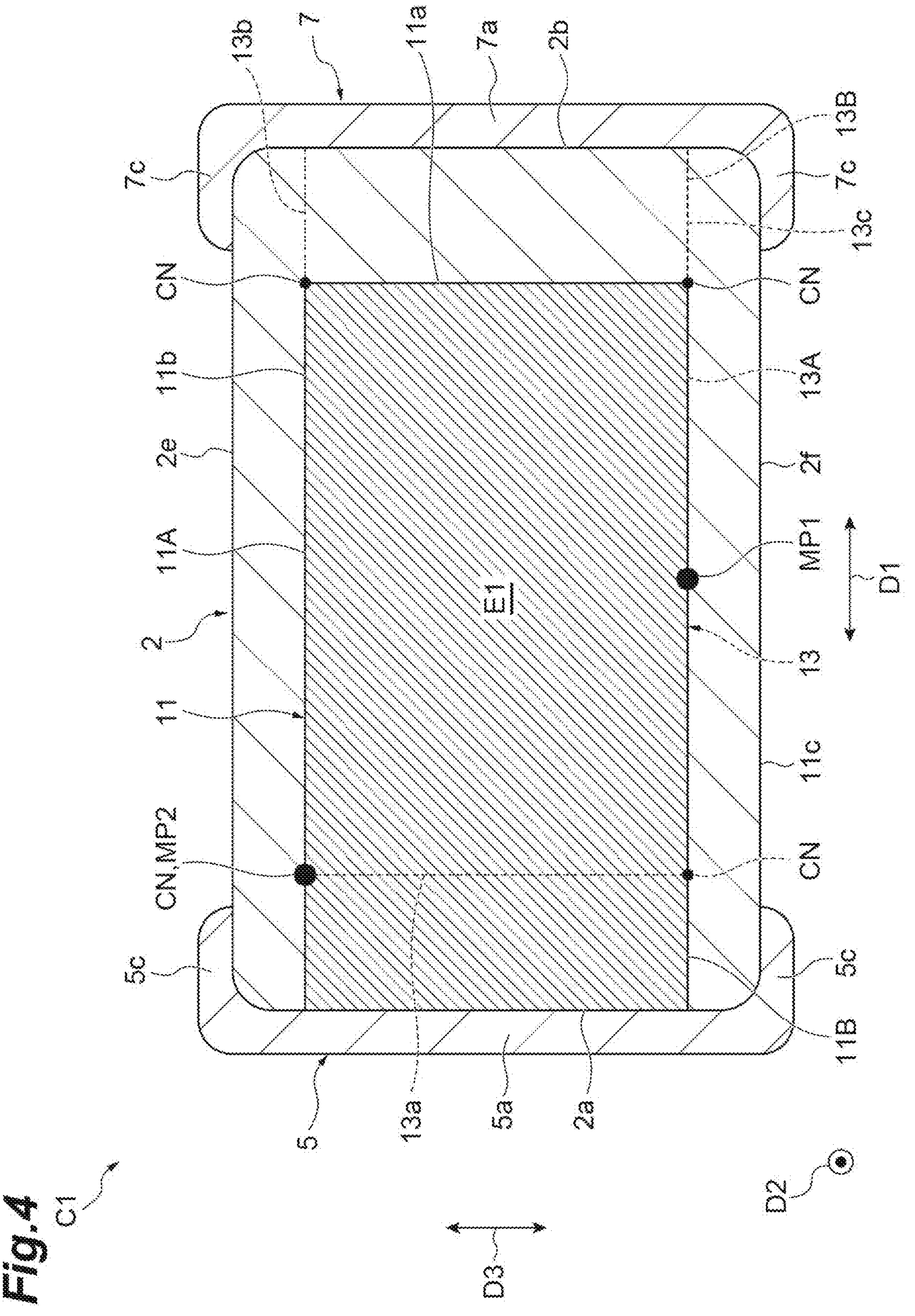
FIG. 4 is a cross-sectional view of a first internal electrode as viewed from a second direction.
Figure 5:
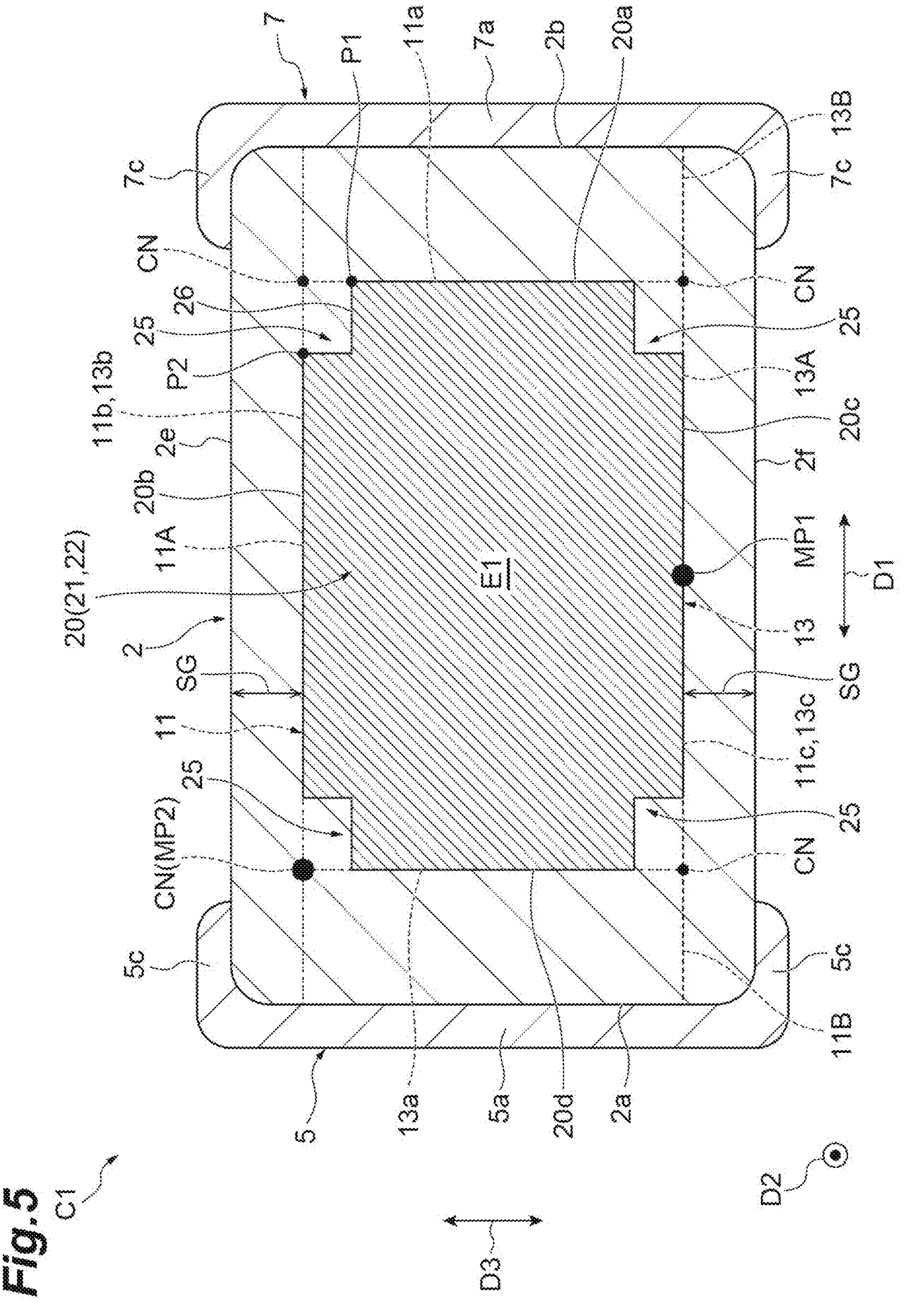
FIG. 5 is a cross-sectional view of an interlayer as viewed from the second direction.

The configuration of an electronic component according to the present embodiment will be described with reference to FIGS. 1 to 5. FIG. 1 is a perspective view illustrating the electronic component according to the present embodiment. FIGS. 2 and 3 are diagrams illustrating cross-sectional configurations of a multilayer capacitor according to the present embodiment. FIG. 4 is a cross-sectional view of a first internal electrode 11 as viewed from a second direction D2. FIG. 5 is a cross-sectional view of an interlayer 20 as viewed from the second direction D2. In the present embodiment, as the electronic component, a multilayer capacitor C1 is exemplified.

As illustrated in FIG. 1, the multilayer capacitor C1 includes an element body 2 having a rectangular parallelepiped shape, and a first terminal electrode 5 and a second terminal electrode 7, which are disposed on outer surfaces of the element body 2. The first terminal electrode 5 and the second terminal electrode 7 are spaced apart from each other. The rectangular parallelepiped shape includes a rectangular parallelepiped shape in which corner portions and ridge line portions are chamfered, or a rectangular parallelepiped shape in which corner portions and ridge line portions are filleted.

The element body 2 has, as the outer surfaces thereof, a pair of end surfaces 2*a* and 2*b* opposite to each other, a pair of main surfaces 2*c* and 2*d* opposite to each other, and a pair of side surfaces 2*e* and 2*f* facing each other. In the present embodiment, a direction in which the pair of end surfaces 2*a* and 2*b* are opposite to each other (first direction D1) is a length direction of the element body 2, a direction in which the pair of main surfaces 2*c* and 2*d* are opposite to each other (second direction D2) is a height direction of the element body 2, and a direction in which the pair of side surfaces 2*e* and 2*f* are opposite to each other (third direction D3) is a width direction of the element body 2.

A length of the element body 2 in the first direction D1 is greater than a length of the element body 2 in the second direction D2 and a length of the element body 2 in the third direction D3. The length of the element body 2 in the second direction D2 is equal to the length of the element body 2 in the third direction D3. In other words, in the present embodiment, the pair of end surfaces 2*a* and 2*b* are square-shaped, and the pair of main surfaces 2*c* and 2*d*, and the pair of side surfaces 2*e* and 2*f* are rectangular-shaped. The length of the element body 2 in the first direction D1 may be equal to the length of the element body 2 in the second direction D2 and the length of the element body 2 in the third direction D3. The length of the element body 2 in the second direction D2 and the length of the element body 2 in the third direction D3 may be different from each other.

It should be noted that "equal" may not only mean being equivalent but also mean being equal to a value including a slight difference, a manufacturing error, or other defects within a preset range. For example, when a plurality of values is included within a range of ±5% of an average value of the plurality of values, the plurality of values is defined to be equal.

The pair of main surfaces 2*c* and 2*d* extends in the first direction D1 to connect the pair of end surfaces 2*a* and 2*b*. The pair of main surfaces 2*c* and 2*d* also extends in the third direction D3. The pair of side surfaces 2*e* and 2*f* extends in the first direction D1 to connect the pair of end surfaces 2*a* and 2*b*. The pair of side surfaces 2*e* and 2*f* also extends in the second direction D2.

The element body 2 is configured by multilayering a plurality of dielectric layers 51 in the direction in which the pair of main surfaces 2*c* and 2*d* are opposite to each other (second direction D2). In the element body 2, the direction in which the plurality of dielectric layers 51 is multilayered (hereinafter, simply referred to as a "multilayering direction") coincides with the second direction D2. Each dielectric layer 51 is composed of, for example, a sintered body of ceramic green sheets containing a dielectric material (dielectric ceramic such as $BaTiO_3$-based, $Ba(Ti,Zr)O_3$-based, or $(Ba,Ca)TiO_3$-based ceramic). In the actual element body 2, the individual dielectric layers 51 are integrated to such an extent that boundaries between the individual dielectric layers 51 cannot be visually recognized. The third direction D3 may be the above-described multilayering direction.

As illustrated in FIGS. 2, 3, and 4, the multilayer capacitor C1 includes a plurality of first internal electrodes 11 and a plurality of second internal electrodes 13. The internal electrodes 11 and 13 are made of a conductive material (for example, Ni, Cu, Ag, Pt, and other conductive materials), which is usually used as an internal conductor of a multilayer electronic component. The internal electrodes 11 and 13 are configured as, for example, sintered bodies of conductive paste containing the above-described conductive material. The internal electrodes 11 and 13 function as internal conductors disposed in the element body 2.

The first internal electrodes 11 and the second internal electrodes 13 are disposed at distinct positions (layers) in the second direction D2. In other words, the first internal electrodes 11 and the second internal electrodes 13 are alternately disposed to be opposite to each other (with an interlayer 20 interposed between a first internal electrode 11 and a second internal electrode 13; the interlayer 20 will be described later) at intervals in the second direction D2 in the element body 2. The first internal electrodes 11 have different polarities from the second internal electrodes 13.

As also illustrated in FIG. 4, each of the first internal electrodes 11 includes a main electrode part 11A and a connection part 11B. The main electrode part 11A is a part that forms electrostatic capacitance when positioned opposite to a main electrode part 13A of a second internal electrode 13 described later. The connection part 11B is a part that connects the main electrode part 11A and the first terminal electrode 5. The connection part 11B extends from one side (one short side) of the main electrode part 11A and is exposed on the end surface 2*a*. The first internal electrodes 11 are exposed on the end surface 2*a* and are not exposed on the end surface 2*b*, the pair of main surfaces 2*c* and 2*d*, and the pair of side surfaces 2*e* and 2*f*. The main electrode part 11A and the connection part 11B are integrally formed.

As illustrated in FIG. 4, the main electrode part 11A has a rectangular shape in which the first direction D1 is a long side direction, and the third direction D3 is a short side direction. In other words, the main electrode part 11A of each of the first internal electrodes 11 has a length in the first direction D1 greater than a length in the third direction D3. The connection part 11B extends from an end portion of the main electrode part 11A on the end surface 2*a* side to the end surface 2*a*. A length of the connection part 11B in the first direction D1 is smaller than a length of the main electrode part 11A in the first direction D1. A length of the connection part 11B in the third direction D3 is equal to a length of the main electrode part 11A in the third direction D3. The connection part 11B is connected to the first terminal electrode 5 at an end portion exposed on the end surface 2*a*. The length of the connection part 11B in the third direction D3 is smaller than the length of the main electrode part 11A in the third direction D3.

As also illustrated in FIG. 4, each of the second internal electrodes 13 includes a main electrode part 13A and a connection part 13B. The main electrode part 13A is a part that forms electrostatic capacitance when positioned opposite to a main electrode part 11A of a first internal electrode 11 described later. The connection part 13B is a part that connects the main electrode part 13A and the second terminal electrode 7. The main electrode part 13A is opposite to the main electrode part 11A with a part (dielectric layer) of the element body 2 interposed therebetween in the second direction D2. The connection part 13B extends from one side (one short side) of the main electrode part 13A and is exposed on the end surface 2*b*. The second internal electrodes 13 are exposed on the end surface 2*b* and are not exposed on the end surface 2*a*, the pair of main surfaces 2*c* and 2*d*, and the pair of side surfaces 2*e* and 2*f*. The main electrode part 13A and the connection part 13B are integrally formed.

As illustrated in FIG. 4, the main electrode part 13A has a rectangular shape in which the first direction D1 is a long side direction, and the third direction D3 is a short side direction. In other words, the main electrode part 13A of each of the second internal electrodes 13 has a length in the first direction D1 greater than a length in the third direction D3. The connection part 13B extends from an end portion of the main electrode part 13A on the end surface 2*b* side to the end surface 2*b*. A length of the connection part 13B in the first direction D1 is smaller than a length of the main electrode part 13A in the first direction D1. A length of the connection part 13B in the third direction D3 is equal to a length of the main electrode part 13A in the third direction D3. The connection part 13B is connected to the second terminal electrode 7 at an end portion exposed on the end surface 2*b*. The length of the connection part 13B in the third direction D3 is smaller than the length of the main electrode part 13A in the third direction D3.

Each of the first internal electrodes 11 has an end portion 11*a* extending in the third direction D3 on the second terminal electrode 7 side, an end portion 11*b* extending in the first direction D1 on the side surface 2*e* side, and an end portion 11*c* extending in the first direction D1 on the side surface 2*f* side. Each of the second internal electrodes 13 has an end portion 13*a* extending in the third direction D3 on the first terminal electrode 5 side, an end portion 13*b* extending in the first direction D1 on the side surface 2*e* side, and an end portion 13*c* extending in the first direction D1 on the side surface 2*f* side. As viewed from the second direction D2, the end portion 11*b* and the end portion 13*b* are overlapped with each other, and the end portion 11*c* and the end portion 13*c* are overlapped with each other. As viewed from the second direction D2, the end portion 11*a* is overlapped with a boundary between the main electrode part 13A and the connection part 13B of the second internal electrode 13. As viewed from the second direction D2, the end portion 13*a* is overlapped with a boundary between the main electrode part 11A and the connection part 11B of the first internal electrode 11. A region E1 where the first internal electrodes 11 and the second internal electrodes 13 are overlapped with each other in the second direction D2 is defined by the end portion 11*a*, the end portion 13*a*, the end portions 11*b* and 13*b*, and the end portions 11*c* and 13*c*.

Each of the first internal electrodes 11 and second internal electrodes 13 includes corner portions CN positioned in the element body 2. The first internal electrode 11 includes a corner portion CN at a position where the end portion 11*a* and the end portion 11*b* intersect with each other, and a corner portion CN at a position where the end portion 11*a* and the end portion 11*c* intersect with each other. Note that, in a case where each corner portion CN has an edge radius or a chamfered portion, the edge radius portion or the chamfered portion corresponds to the corner portion CN. The corner portions CN are buried at positions spaced apart from surfaces of the element body 2 toward the inner peripheral side, respectively.

The first terminal electrode 5 is positioned at an end portion on the end surface 2*a* side of the element body 2 as viewed from the first direction D1. The first terminal electrode 5 includes an electrode portion 5*a* positioned on the end surface 2*a*, electrode portions 5*b* positioned on the pair of main surfaces 2*c* and 2*d*, and electrode portions 5*c* positioned on the pair of side surfaces 2*e* and 2*f*. In other words, the first terminal electrode 5 is formed of the five surfaces 2*a*, 2*c*, 2*d*, 2*e*, and 2*f*.

The electrode portions 5*a*, 5*b*, and 5*c* adjacent to one another are connected at ridge line portions of the element body 2 and electrically connected to one another. The electrode portion 5*a* and the electrode portions 5*b* are connected at ridge line portions between the end surface 2*a* and the main surface 2*c* and between the end surface 2*a* and the main surface 2*d*. The electrode portion 5*a* and the electrode portions 5*c* are connected at ridge line portions between the end surface 2*a* and the side surface 2*e* and between the end surface 2*a* and the side surface 2*f*.

The electrode portion 5*a* is disposed to cover all the portions of the connection parts 11B exposed on the end surface 2*a*, and the connection parts 11B are directly connected to the first terminal electrode 5. In other words, the connection part 11B connects the main electrode part 11A and the electrode portions 5*c*. Therefore, each of the first internal electrodes 11 is electrically connected to the first terminal electrode 5.

The second terminal electrode 7 is positioned at an end portion on the end surface 2*b* side of the element body 2 as viewed from the first direction D1. The second terminal electrode 7 includes an electrode portion 7*a* positioned on the end surface 2*b*, electrode portions 7*b* positioned on the pair of main surfaces 2*c* and 2*d*, and electrode portions 7*c* positioned on the pair of side surfaces 2*e* and 2*f*. In other words, the second terminal electrode 7 is formed of the five surfaces 2*b*, 2*c*, 2*d*, 2*e*, and 2*f*.

The electrode portions 7*a*, 7*b*, and 7*c* adjacent to each other are connected at ridge line portions of the element body 2 and electrically connected to each other. The electrode portion 7*a* and the electrode portions 7*b* are connected at ridge line portions between the end surface 2*b* and the main surface 2*c* and between the end surface 2*b* and the main surface 2*d*. The electrode portion 7*a* and the electrode portions 7*c* are connected at ridge line portions between the end surface 2*b* and the side surface 2*e* and between the end surface 2*b* and the side surface 2*f*.

The electrode portion 7*a* is disposed to cover all the portions of the connection parts 13B exposed on the end surface 2*b*, and the connection parts 13B are directly connected to the second terminal electrode 7. In other words, the connection part 13B connects the main electrode part 13A and the electrode portions 7*c*. Therefore, each of the second internal electrodes 13 is electrically connected to the second terminal electrode 7.

As illustrated in FIGS. 2 and 3, the multilayer capacitor C1 includes a plurality of interlayers 20 disposed in the element body 2. Each of the interlayers 20 is disposed between the first internal electrode 11 and the second internal electrode 13, and the interlayers 20 are disposed at distinct positions (layers) in the second direction D2. In other words, the interlayers 20 are disposed at intervals in the second direction D2 in the element body 2 such that each interlayer 20 is opposite to each of the first internal electrode 11 and the second internal electrode 13. The interlayers 20 are disposed to be spaced apart from the first terminal electrode 5 and the second terminal electrode 7 toward the inner peripheral side in the first direction D1, and the interlayers 20 and the first terminal electrode 5 and second terminal electrode 7 are not electrically connected. Note that, in the present embodiment, the interlayers 20 are disposed in all regions, each being positioned between the first internal electrode 11 and the second internal electrode 13. Note that the interlayers 20 may not be provided in some regions.

The interlayer 20 functions as a dissimilar material layer 21 made of a material different from that of the element body 2. The interlayer 20 as the dissimilar material layer 21 may be a metal layer. Ni, Cu, Ag, Pt, Au, alloy species thereof, and other metals may be employed as materials for the metal layer. As the material of the interlayer 20, the same material as those of the internal electrodes 11 and 13 may be employed, or a different material may be employed. The interlayer 20 is configured as, for example, a sintered body of conductive paste containing the above-described metal material.

The interlayer 20 as the dissimilar material layer 21 has a linear expansion coefficient greater than a linear expansion coefficient of the element body 2. Specifically, the linear expansion coefficient of the interlayer 20 as the dissimilar material layer 21 may be greater than the linear expansion coefficient of the element body 2 by $0.5\times10^{-6}\ K^{-1}$ or more, and more preferably $2.0\times10^{-6}\ K^{-1}$ or more. Note that the upper limit value of the linear expansion coefficient of the interlayer 20 as the dissimilar material layer 21 is not particularly limited, but may be $30.0\times10^{-6}\ K^{-1}$ or less. The thickness of the interlayer 20 as the dissimilar material layer 21 is greater than the thicknesses of the internal electrodes 11 and 13. For example, the thickness of the interlayer 20 as the dissimilar material layer 21 may be 1.1 times or more, more preferably 1.3 times or more the thicknesses of the internal electrodes 11 and 13. The upper limit value of the thickness of the interlayer 20 as the dissimilar material layer 21 is not particularly limited, but may be 5.0 times or less the thicknesses of the internal electrodes 11 and 13. Note that the thicknesses of the internal electrodes 11 and 13 may be set to 0.5 to 1.5 μm.

As illustrated in FIG. 5, as viewed from the second direction, the interlayer 20 is overlapped with at least a part of the main electrode part 11A of the first internal electrode 11. As viewed from the second direction, the interlayer 20 is overlapped with at least a part of the main electrode part 13A of the second internal electrode 13.

Each interlayer 20 has an end portion 20*a* extending in the third direction D3 on the second terminal electrode 7 side, an end portion 20*d* extending in the third direction D3 on the first terminal electrode 5 side, an end portion 20*b* extending in the first direction D1 on the side surface 2*e* side, and an end portion 20*c* extending in the first direction D1 on the side surface 2*f* side. As viewed from the second direction D2, the end portion 20*b* and the end portions 11*b* and 13*b* are overlapped with one another, and the end portion 20*c* and the end portions 11*c* and 13*c* are overlapped with one another. As viewed from the second direction D2, the end portion 20*a* is overlapped with the end portion 11*a* and the boundary between the main electrode part 13A and the connection part 13B of the second internal electrode 13. As viewed from the second direction D2, the end portion 20*d* is overlapped with the end portion 13*a* and the boundary between the main electrode part 11A and the connection part 11B of the first internal electrode 11. Therefore, as viewed from the second direction, the interlayer 20 is overlapped with at least a part of a region E1 (region where electrostatic capacitance is generated) where the first internal electrode 11 and the second internal electrode 13 are overlapped with each other in the second direction D2.

As viewed from the second direction D2, the interlayer 20 is not overlapped with the corner portions CN of the internal electrodes 11 and 13. That is, as viewed from the second direction D2, a conductor pattern constituting the interlayer 20 is not present at the positions corresponding to corner portions CN of the interlayer 20. As a result, the corner portions CN and regions in the vicinity of the corner portions CN in the internal electrodes 11 and 13 are not opposite to the interlayer 20 in the second direction D2. As viewed from the second direction D2, the end portions of the interlayer 20 at the positions corresponding to the corner portions CN are disposed to be spaced apart from the corner portions CN toward the inner peripheral side in the first direction and the inner peripheral side in the third direction.

In the present embodiment, the interlayer 20 includes notched portions 25 at the positions corresponding to the four corner portions CN. The notched portions 25 are portions having a shape in which the four corner portions (and the vicinity of each of the corner portions) of the interlayer 20 are cut out so that the interlayer 20 is not overlapped with the corner portions CN of the internal electrodes 11 and 13. A starting point P1 is set at a position spaced apart from a corner portion CN toward the inner peripheral side in the third direction D3 with respect to the end portion (end portion 20*a* in FIG. 5) of the interlayer 20. A starting point P2 is set at a position spaced apart from the corner portion CN toward the inner peripheral side in the first direction D1 with respect to the end portion (the end portion 20*b* in FIG. 5) of the interlayer 20. Each notched portion 25 has an edge portion 26 that extends linearly or recessed toward the inner peripheral side between the starting point P1 and the starting point P2.

The interlayer 20 includes notched portions 25 separately provided at the positions corresponding to a corner portion between the end portions 20*a* and 20*b*, a corner portion between the end portions 20*a* and 20*c*, a corner portion between the end portions 20*d* and 20*b*, and a corner portion between the end portions 20*d* and 20*c*. Note that, the notched portion 25 is the term indicating a shape, and is not intended to limit a forming method, and a conductor pattern patterned into a desirable shape also corresponds to the notched portion 25. A specific example of the notched portion 25 will be described later.

With the above-described configuration, the interlayer 20 functions as a compressive stress introduction layer 22 that introduces compressive stress into the element body 2. The compressive stress introduction layer 22 introduces compressive stress into side gap sections SG between the internal electrodes 11 and 13 and the side surfaces 2*e* and 2*f* of the element body 2 in the third direction D3. As illustrated in FIG. 3, the compressive stress introduction layer 22 introduces a compressive stress F1 to generate compression in the second direction D2 into the side gap sections SG.

Figure 6A:
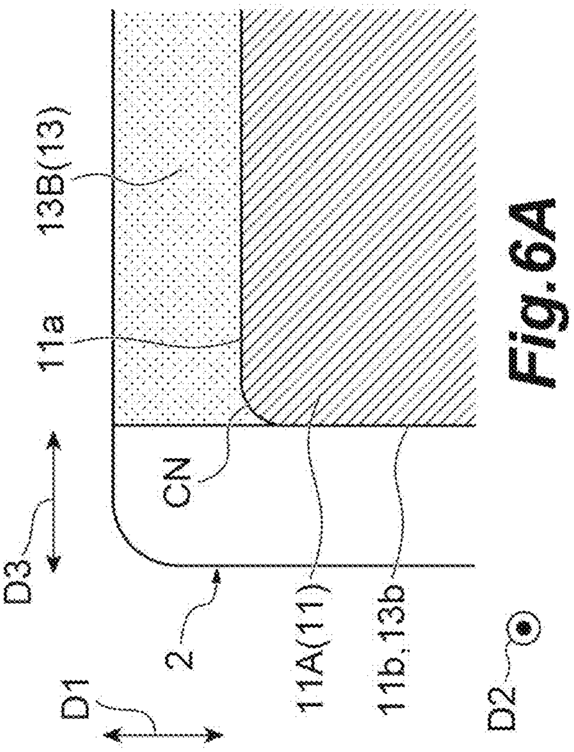
FIGS. 6A to 6D are conceptual diagrams illustrating specific configurations of notched portions.
Figure 6B:
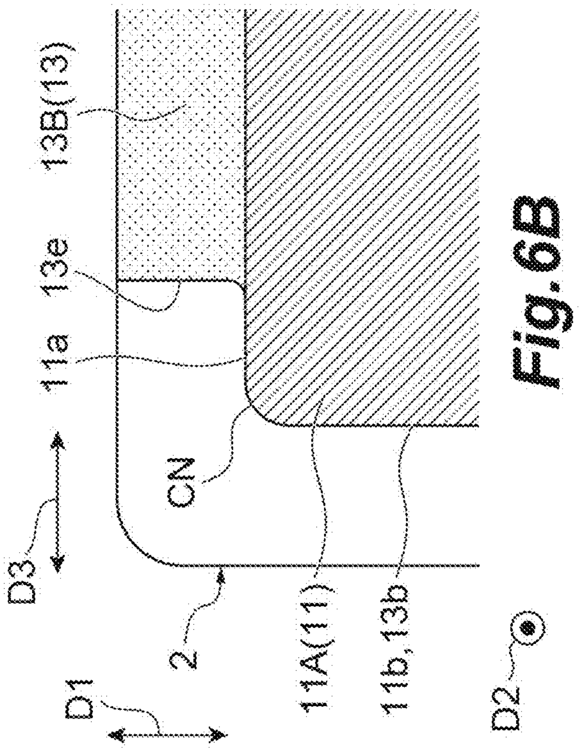

Next, specific examples of the notched portions 25 will be described with reference to FIGS. 6A to 6D, 7A to 7D, and 8A to 8D. FIGS. 6A to 6D, 7A to 7D, and 8A to 8D are schematic diagrams illustrating structures in the vicinity of the corner portions CN as viewed from the second direction D2. Note that, unless otherwise specified, the illustrations of FIGS. 6A to 6D, 7A to 7D, and 8A to 8D are assumed to describe the configurations as viewed from the second direction D2. In addition, in FIGS. 6A to 6D, 7A to 7D, and 8A to 8D, it is indicated that a pattern is applied to a section where the internal electrodes 11 and 13 are present, a dark pattern is applied to a section with the internal electrodes 11 and 13 being overlapped, and hatching is applied to a section with the interlayer 20 being overlapped. The same applies to FIGS. 9A and 9B, 10A and 10B, and 11A to 11C. FIGS. 6A and 6B illustrate configurations in a state where the interlayers 20 are not overlapped. As illustrated in FIGS. 6A and 6B here, the configurations in the vicinity of the corner portions CN between the end portion 11*a* and the end portions 11*b* and 13*b* are illustrated. The corner portion CN is formed with an edge radius between the end portion 11*a* and the end portions 11*b* and 13*b*. The corner portion CN has a shape protruding toward the outer peripheral side. FIG. 6B illustrates the configuration in which a narrow portion 13*e* is provided on the connection part 13B of the second internal electrode 13. The narrow portion 13*e* is a portion where the width of the connection part 13B in the third direction D3 is narrower than that of the main electrode part 13A. The narrow portion 13*e* is disposed toward the inner peripheral side in the third direction with respect to the end portion 13*b*.

Figure 6C:
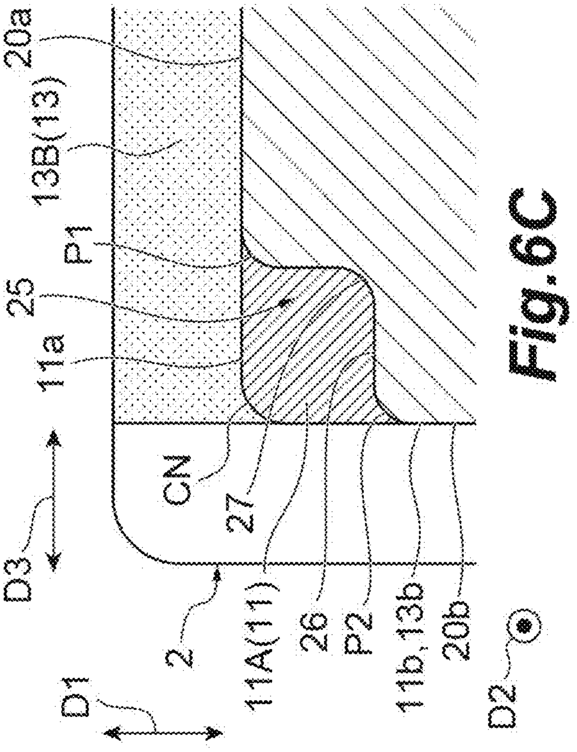
Figure 6D:
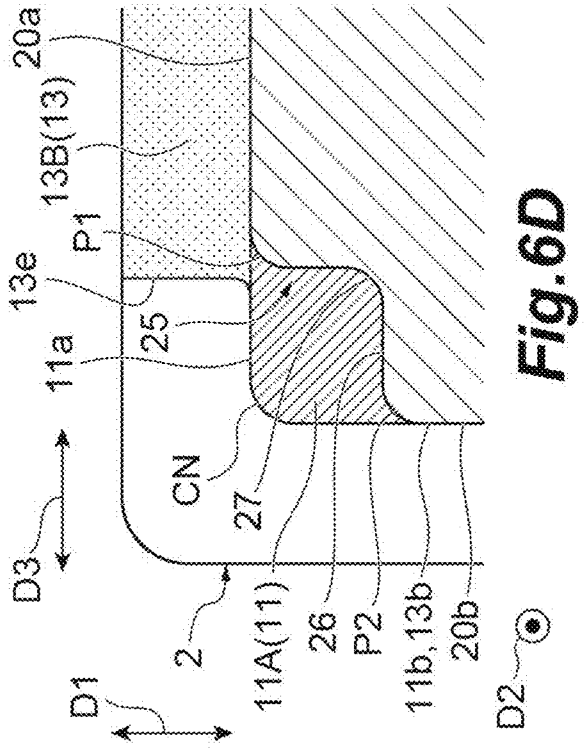

A notched portion 25 illustrated in FIG. 6C has, between the starting point P1 and the starting point P2, an edge portion 26 bent at a right angle to be recessed toward the inner peripheral side. The edge portion 26 extends in the first direction D1 from the starting point P1, is bent, and extends in the third direction D3 to the starting point P2. The notched portion 25 is shaped to be away from the corner portion CN toward the inner peripheral side. In addition, the bent portion of the edge portion 26 is provided with an edge radius. Therefore, the notched portion 25 has a curved portion 27 that is curved as viewed from the second direction D2. In addition, edge radii are also provided at the starting points P1 and P2 to form curved portions. As viewed from the second direction D2, the curved portion 27 is curved in such a manner as to be away from the corner portion CN toward the inner peripheral side. FIG. 6D illustrates a structure in which a notched portion 25 having the same intention as that in FIG. 6C with respect to the structure including the narrow portion 13*e* in FIG. 6B is employed.

Figures 7A, 7B, 7C, 7D:
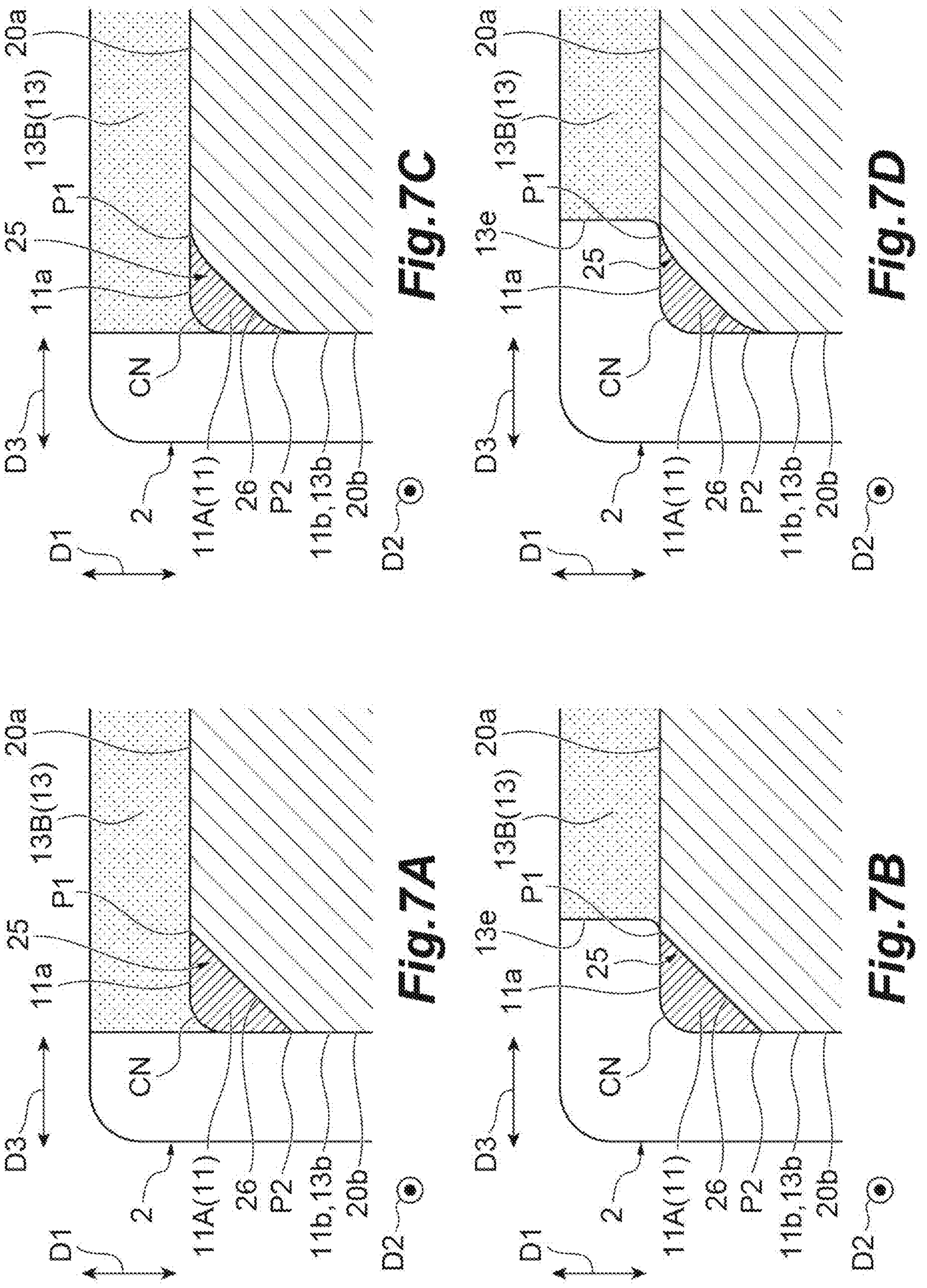
FIGS. 7A to 7D are conceptual diagrams illustrating specific configurations of notched portions.

A notched portion 25 illustrated in FIG. 7A has an edge portion 26 that extends obliquely in a straight line between the starting point P1 and the starting point P2. No edge radii are provided at the starting points P1 and P2. FIG. 7B illustrates a structure in which a notched portion 25 having the same intention as that in FIG. 7A with respect to the structure including the narrow portion 13*e* in FIG. 6B is employed. A notched portion 25 illustrated in FIG. 7C is formed as a curved portion by providing an edge radius between the starting points P1 and P2 with respect to the notched portion 25 illustrated in FIG. 7A. FIG. 7D illustrates a structure in which a notched portion 25 having the same intention as that in FIG. 7C with respect to the structure including the narrow portion 13*e* in FIG. 6B is employed.

Figure 8A:
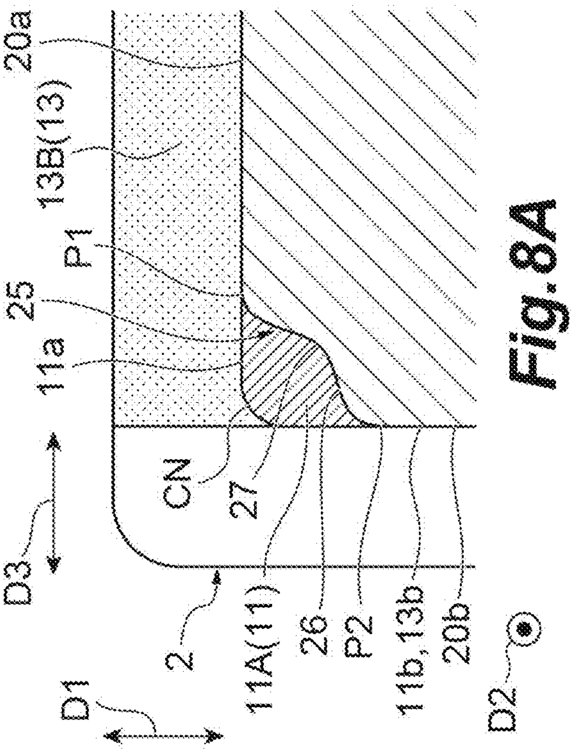
FIGS. 8A to 8D are conceptual diagrams illustrating specific configurations of notched portions.
Figure 8B:
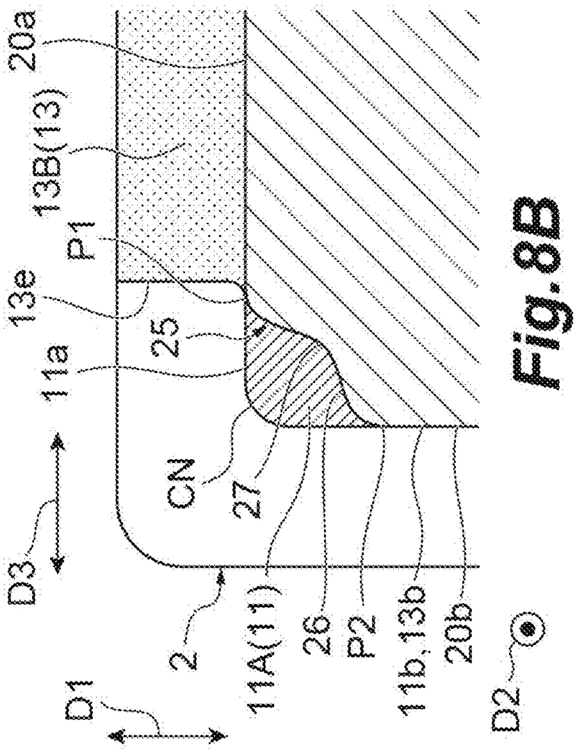

A notched portion 25 illustrated in FIG. 8A has, between the starting point P1 and the starting point P2, an edge portion 26 that extends to be recessed toward the inner peripheral side. The edge portion 26 extends obliquely in the first direction D1 from the starting point P1, is bent, and extends obliquely in the third direction D3 to the starting point P2. The notched portion 25 is shaped to be away from the corner portion CN toward the inner peripheral side. In addition, the bent portion of the edge portion 26 is provided with an edge radius. Therefore, the notched portion 25 has a curved portion 27 that is curved as viewed from the second direction D2. In addition, edge radii are also provided at the starting points P1 and P2 to form curved portions. As viewed from the second direction D2, the curved portion 27 is curved in such a manner as to be away from the corner portion CN toward the inner peripheral side. FIG. 8B illustrates a structure in which a notched portion 25 having the same intention as that in FIG. 8A with respect to the structure including the narrow portion 13*e* in FIG. 6B is employed.

Figure 8C:
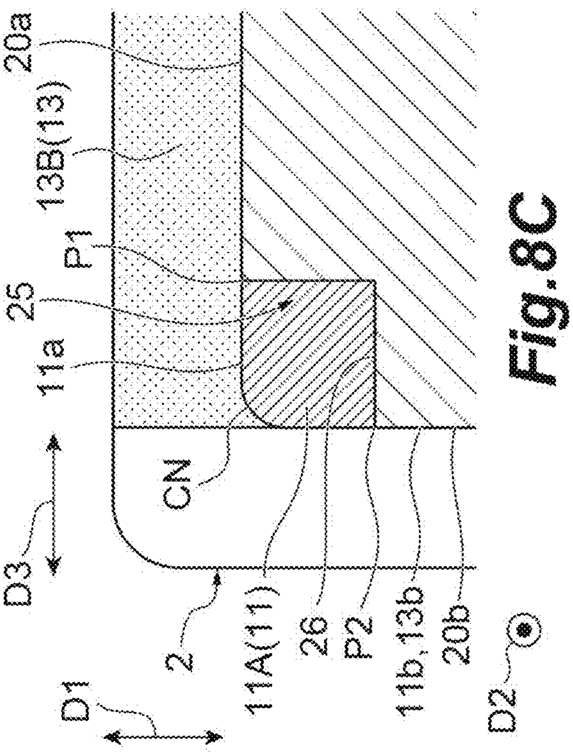
Figure 8D:
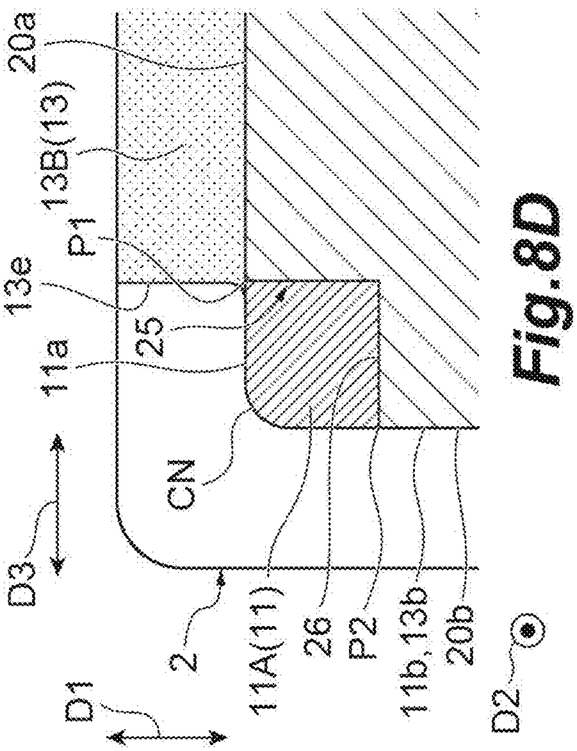

A notched portion 25 illustrated in FIG. 8C has, between the starting point P1 and the starting point P2, an edge portion 26 bent at a right angle to be recessed toward the inner peripheral side. The edge portion 26 extends in the first direction D1 from the starting point P1, is bent, and extends in the third direction D3 to the starting point P2. The notched portion 25 is shaped to be away from the corner portion CN toward the inner peripheral side. In addition, the bent portion of the edge portion 26 is provided with no edge radius. In addition, no edge radii are also provided at the starting points P1 and P2. FIG. 8D illustrates a structure in which a notched portion 25 having the same intention as that in FIG. 8C with respect to the structure including the narrow portion 13*e* in FIG. 6B is employed.

Figure 9B:
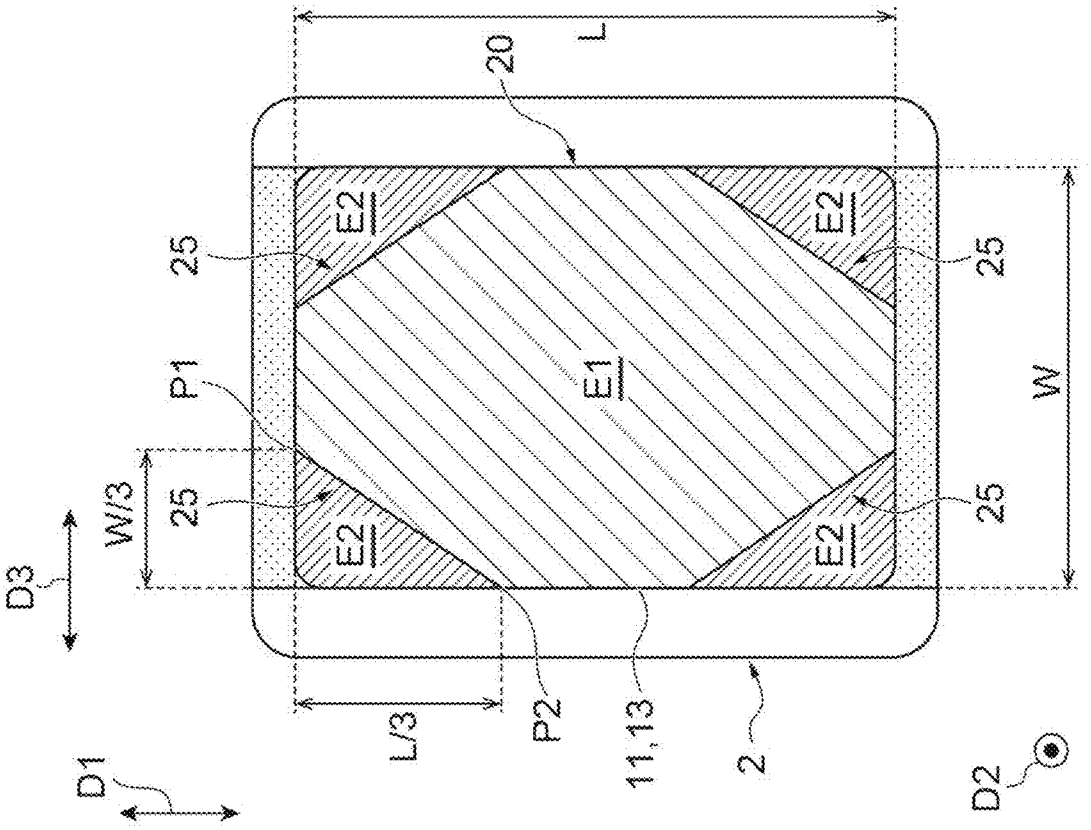
FIGS. 9A and 9B are conceptual diagrams illustrating specific configurations of notched portions.
Figure 9A:
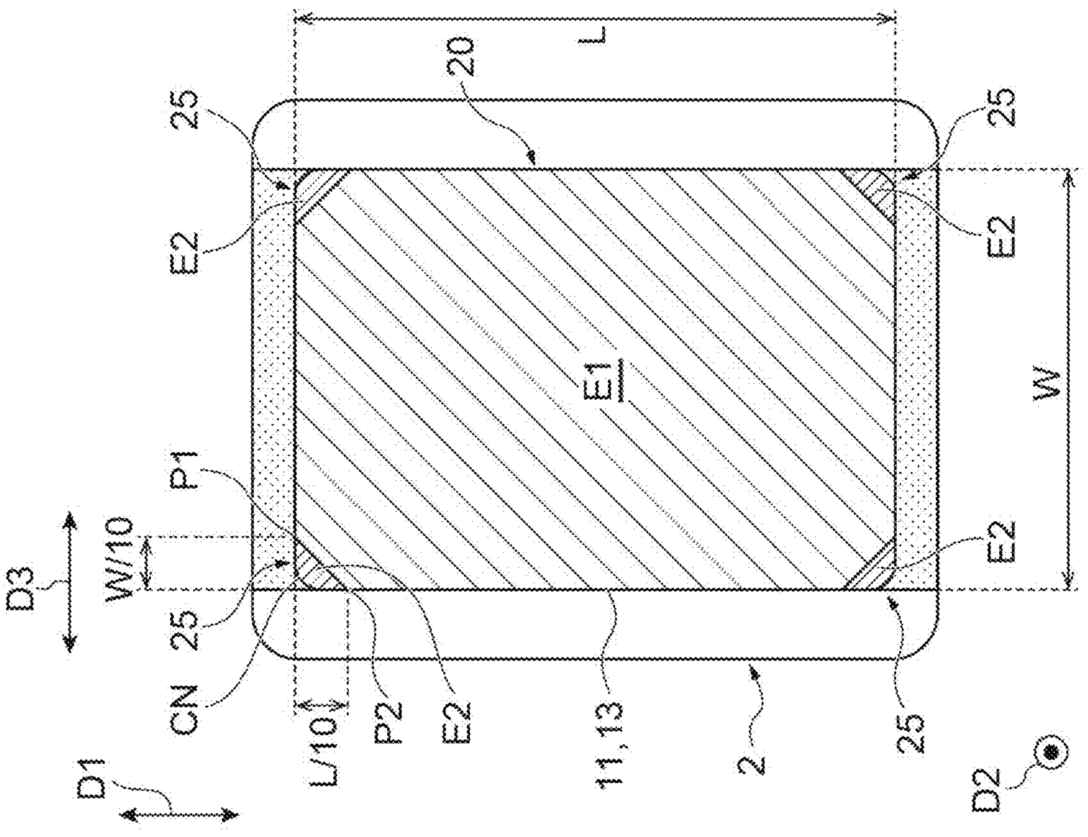

The size of the notched portions 25 will be described with reference to FIGS. 9A and 9B. FIG. 9A is a schematic diagram illustrating a structure in a case where notched portions 25 have a minimum size. FIG. 9B is a schematic diagram illustrating a structure in a case where notched portions 25 have a maximum size. Note that, although the shape of the notched portions 25 corresponding to FIG. 7A is employed herein, the same size relationship applies to other shapes. In a region E1 where the first internal electrode 11 and the second internal electrode 13 overlap in the second direction D2, a dimension in the third direction D3 is denoted by W. In the overlapping region E1, a dimension in the first direction D1 is denoted by L. As illustrated in FIG. 9A, the minimum size of each notched portion 25 in the third direction D3 is W/10, and the minimum size in the first direction D1 is L/10. As illustrated in FIG. 9B, the maximum size of each notched portion 25 in the third direction D3 is W/3, and the maximum size in the first direction D1 is L/3.

As described above, a region E2 of the corner portion CN, which is not overlapped with the interlayer 20, has a dimension of W/10 or more and W/3 or less in the third direction D3. In other words, the notched portion 25 has a dimension of W/10 or more and W/3 or less in the third direction D3. In addition, the region E2 of the corner portion CN, which is not overlapped with the interlayer 20, has a dimension of L/10 or more and L/3 or less in the first direction D1. In other words, the notched portion 25 has a dimension of L/10 or more and L/3 or less in the first direction D1.

Next, operations and effects of the multilayer capacitor C1 (electronic component) according to the present embodiment will be described.

In the multilayer capacitor C1, the first internal electrode 11 and the second internal electrode 13 are opposite to each other in the second direction D2, with the dissimilar material layer 21 containing a material different from that of the element body 2 interposed therebetween. In this manner, since the dissimilar material layer 21 is additionally provided to be overlapped with the internal electrodes 11 and 13, the volume of the member having the linear expansion coefficient greater than that of the element body 2 is increased, so that a compressive stress F1 (see FIG. 3) can be introduced into side gap sections SG between the internal electrodes 11 and 13 and the side surfaces 2*e* and 2*f* of the element body 2. As a result, even though electrostrictive vibration occurs when a voltage is applied, the generation of electrostrictive cracks can be minimized by reducing a tensile stress F2 (see FIG. 3) at the central portion in the side gap section SG in the second direction D2. In addition, unlike the thinning and multilayering of the dielectric layers 51 (see FIGS. 2 and 3), it is possible to reduce electrostrictive cracks while reducing deterioration due to a high-temperature load. Here, as viewed from the second direction D2, the dissimilar material layer is not overlapped with the corner portions CN of the internal electrodes 11 and 13. Therefore, it is possible to relax the stress at the corner portion CN of the outermost internal electrodes 11 and 13. In addition, as the electric field strength increases, the amount of electrostriction increases, and the effect of increasing the compressive stress is thus less likely to be obtained. However, in the present embodiment, the dissimilar material layer 21 can be used to establish a countermeasure to minimize the increase in the electric field strength. As described above, it is possible to reduce the electrostrictive cracks and relax the stress at the corner portions CN of the internal electrodes 11 and 13.

The element body 2 may contain a ceramic material, and the dissimilar material layer 21 may include a metal layer. In this case, a linear expansion coefficient of the dissimilar material layer 21 can be higher than that of the element body 2.

In the region E1 where the first internal electrode 11 and the second internal electrode 13 are overlapped with each other in the second direction D2, when the dimension in the third direction D3 perpendicular to the first direction D1 and the second direction D2 is denoted by W, the dimension in the third direction of the region overlapped with no dissimilar material layer 21 in the corner portion CN may be W/10 or more and W/3 or less. In this case, the region of the corner portion CN overlapped with no dissimilar material layer 21 can be sufficiently secured, and the compressive stress can be sufficiently introduced into the side gap section by restricting the excessive widening of the region.

In the region E1 where the first internal electrode 11 and the second internal electrode 13 are overlapped with each other in the second direction D2, when the dimension in the first direction D1 is denoted by L, the dimension in the first direction D1 of the region E2 overlapped with no dissimilar material layer 21 in the corner portion CN may be L/10 or more and L/3 or less. In this case, the region E2 of the corner portion CN overlapped with no dissimilar material layer 21 can be sufficiently secured, and the compressive stress can be sufficiently introduced into the side gap section SG by restricting the excessive widening of the region E2.

The dissimilar material layer 21 may have the notched portions 25 at the positions corresponding to the corner portions CN, and each notched portion 25 may be shaped to be away from each corner portion CN toward the inner peripheral side as viewed from the second direction D2. Since the distance between each corner portion CN of the internal electrodes 11 and 13 and the edge portion 26 of the notched portion 25 of the dissimilar material layer 21 can be increased, the stress at each corner portion CN of the internal electrodes 11 and 13 can be relaxed.

The dissimilar material layer 21 may have the notched portions 25 at the positions corresponding to the corner portions CN, and each notched portion 25 may have a curved portion 27 that is curved as viewed from the second direction D2. In this case, the electric field concentration on the notched portion 25 can be alleviated.

As viewed from the second direction D2, the curved portion 27 may be curved in such a manner as to be away from each corner portion CN toward the inner peripheral side. In this case, since the distance between each corner portion CN of the internal electrodes 11 and 13 and the edge portion 26 of the notched portion 25 of the dissimilar material layer 21 can be increased, the stress at each corner portion CN of the internal electrodes 11 and 13 can be relaxed.

The corner portion CN may have a shape protruding toward the outer peripheral side. In this case, the electric field concentration on the corner portion CN can be alleviated.

The thickness of the dissimilar material layer 21 may be "thickness of dissimilar material layer≥thickness of internal electrode" with respect to the thicknesses of the first internal electrode 11 and the second internal electrode 13 (see, for example, FIGS. 14 and 15 described later), and is preferably "thickness of dissimilar material>thickness of internal electrode". In this case, the thickness of the dissimilar material layer 21 can be increased to increase the breakdown voltage.

The thickness of the dissimilar material layer 21 may be 1.3 times or more the thicknesses of the first internal electrode 11 and the second internal electrode 13. In this case, the thickness of the dissimilar material layer 21 can be sufficiently increased to increase the breakdown voltage.

In the multilayer capacitor C1, the first internal electrode 11 and the second internal electrode 13 are opposite to each other in the second direction D2, with the compressive stress introduction layer 22 that introduces compressive stress into the element body 2 interposed therebetween. The compressive stress introduction layer 22 can introduce a compressive stress F1 (see FIG. 3) into the side gap sections SG between the first internal electrode 11 and second internal electrode 13 and the side surfaces 2*e* and 2*f* of the element body 2 in the third direction D3. As a result, even though electrostrictive vibration occurs when a voltage is applied, the generation of electrostrictive cracks can be minimized by reducing a tensile stress F2 (see FIG. 3) at the central portion in the side gap section SG in the second direction D2. In addition, unlike the thinning and multilayering of the dielectric layers 51 (see FIGS. 2 and 3), it is possible to reduce electrostrictive cracks while reducing deterioration due to a high-temperature load. Here, as viewed from the second direction D2, the compressive stress introduction layer 22 is not overlapped with the corner portions CN of the internal electrodes 11 and 13. Therefore, it is possible to relax the stress at the corner portion CN of the outermost internal electrodes 11 and 13. As described above, it is possible to reduce the electrostrictive cracks and relax the stress at the corner portions CN of the internal electrodes 11 and 13.

The present disclosure is not limited to the embodiments described above.

Modifications of the shape of the interlayer 20 will be described with reference to FIGS. 10A and 10B, and 11A to 11C. FIGS. 10A and 10B, and 11A to 11C are schematic diagrams of modifications of the interlayer 20 as viewed from the second direction D2. As illustrated in FIG. 10A, the interlayer 20 may be divided in the first direction D1 by a slit 28. The slit 28 includes the central position of the internal electrodes 11 and 13 in the first direction D1 and extends in the third direction. The interlayer 20 is divided into an interlayer 20A and an interlayer 20B, with the slit 28 interposed therebetween.

The interlayers 20A and 20B have widths smaller than those of the internal electrodes 11 and 13 in the first direction D1. In addition, the interlayer 20A is disposed on one end portion side of the internal electrodes 11 and 13 in the first direction D1 as viewed from the second direction D2. The interlayer 20B is disposed on the other end portion side of the internal electrodes 11 and 13 in the first direction D1 as viewed from the second direction D2.

Figure 10B:
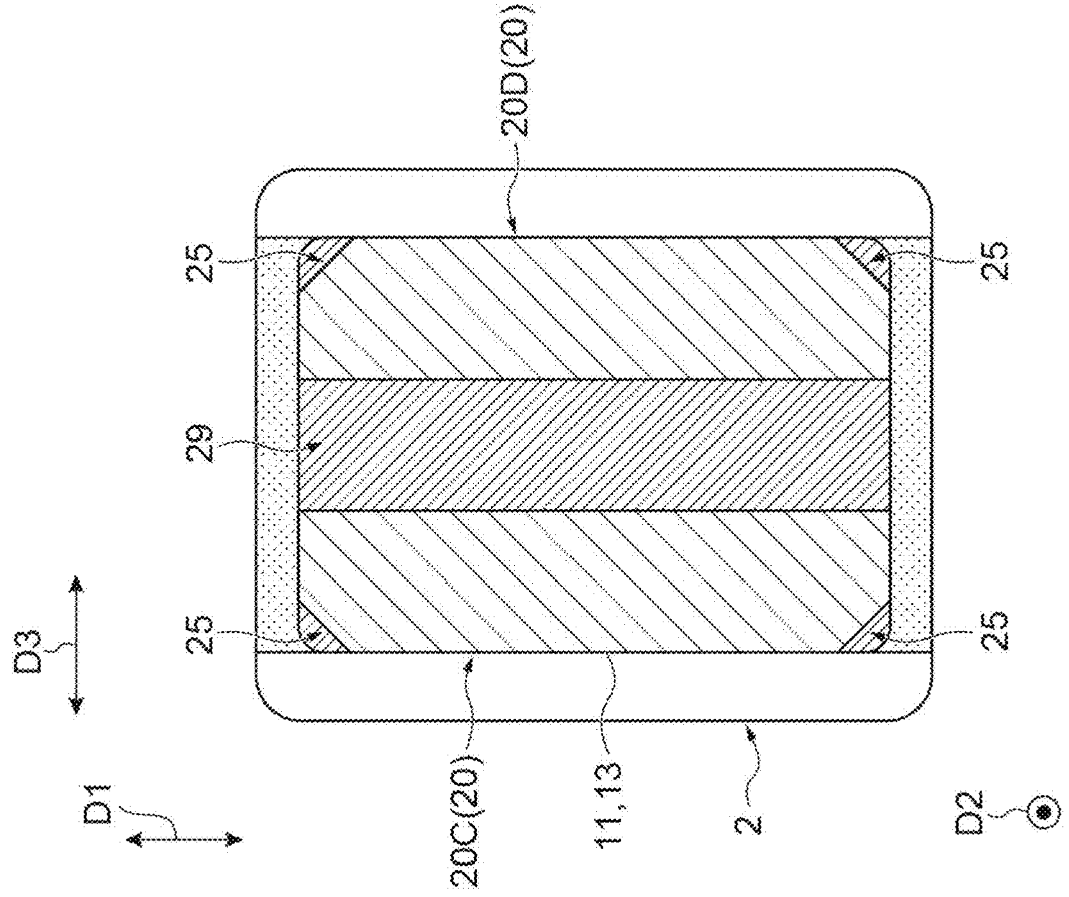
FIGS. 10A and 10B are conceptual diagrams illustrating specific configurations of notched portions.
Figure 10A:
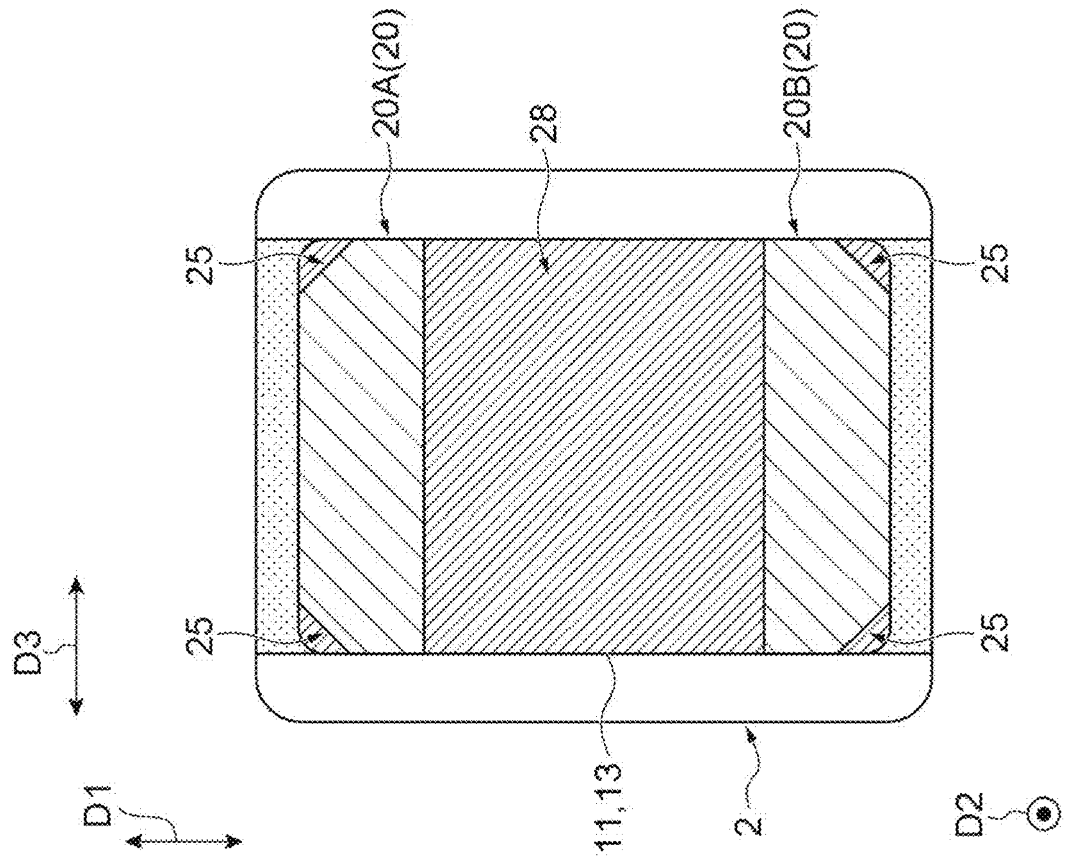

As illustrated in FIG. 10B, the interlayer 20 may be divided in the third direction D3 by a slit 29. The slit 29 includes the central position of the internal electrodes 11 and 13 in the third direction D3 and extends in the first direction D1. The interlayer 20 is divided into an interlayer 20C and an interlayer 20D, with the slit 29 interposed therebetween.

The interlayers 20C and 20D have widths smaller than those of the internal electrodes 11 and 13 in the third direction D3. In addition, the interlayer 20C is disposed on one end portion side of the internal electrodes 11 and 13 in the third direction D3 as viewed from the second direction D2. The interlayer 20D is disposed on the other end portion side of the internal electrodes 11 and 13 in the third direction D3 as viewed from the second direction D2.

Figures 11A, 11B, 11C:
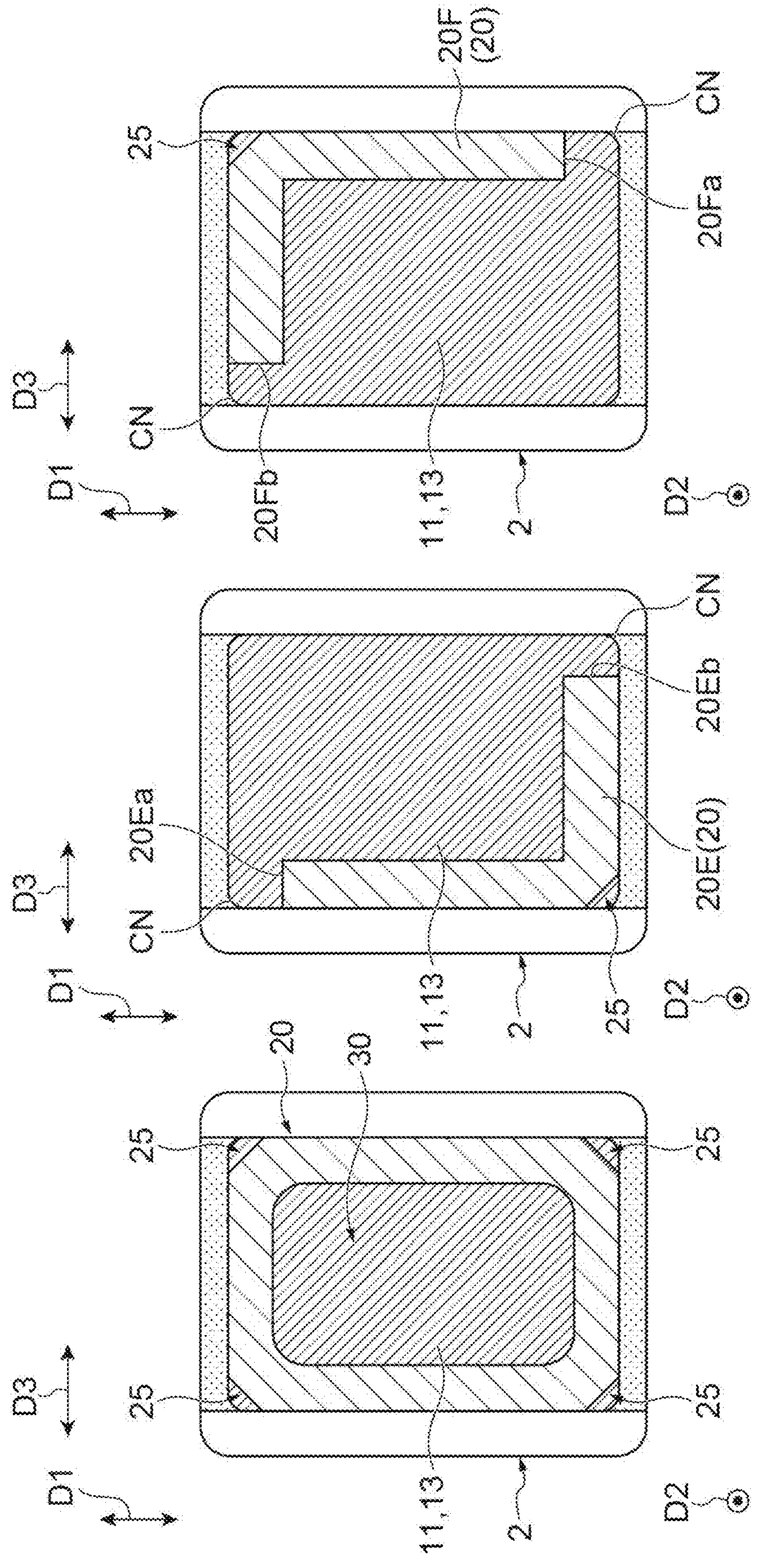
FIGS. 11A to 11C are conceptual diagrams illustrating specific configurations of notched portions.

As illustrated in FIG. 11A, the interlayer 20 may have an annular shape with a penetration portion 30. The interlayer 20 is disposed to overlap along the four end portions of the internal electrodes 11 and 13. The interlayer 20 has a width smaller than those of the internal electrodes 11 and 13 in the first direction D1, and has portions disposed on both end portion sides of the internal electrodes 11 and 13 in the first direction D1 as viewed from the second direction D2. The interlayer 20 has a width smaller than those of the internal electrodes 11 and 13 in the third direction D3, and has portions disposed on both end portion sides of the internal electrodes 11 and 13 in the third direction D3 as viewed from the second direction D2.

As illustrated in FIGS. 11B and 11C, a structure in which an annular interlayer 20 is formed by combining a pair of L-shaped interlayers 20E and 20 F may be employed. The interlayer 20E illustrated in FIG. 11B has a width smaller than those of the internal electrodes 11 and 13 in the first direction D1, and has a portion disposed on one end portion side of the internal electrodes 11 and 13 in the first direction D1 as viewed from the second direction D2. The interlayer 20E has a width smaller than those of the internal electrodes 11 and 13 in the third direction D3, and has a portion disposed on one end portion side of the internal electrodes 11 and 13 in the third direction D3 as viewed from the second direction D2. Note that a notched portion 25 is provided at a L-shaped corner portion. End portions 20Ea and 20Eb of the interlayer 20E in an L-shaped longitudinal direction are disposed at positions overlapped with no corner portion CN of the internal electrodes 11 and 13.

The interlayer 20F illustrated in FIG. 11C has a width smaller than those of the internal electrodes 11 and 13 in the first direction D1, and has a portion disposed on the other end portion side of the internal electrodes 11 and 13 in the first direction D1 as viewed from the second direction D2. The interlayer 20F has a width smaller than those of the internal electrodes 11 and 13 in the third direction D3, and has a portion disposed on the other end portion side of the internal electrodes 11 and 13 in the third direction D3 as viewed from the second direction D2. Note that a notched portion 25 is provided at a L-shaped corner portion. End portions 20Fa and 20Fb of the interlayer 20F in an L-shaped longitudinal direction are disposed at positions overlapped with no corner portion CN of the internal electrodes 11 and 13.

The combination of the end portion 20Ea and the end portion 20Fb described above can form a shape in which the interlayer 20 is not overlapped with the corner portion CN as viewed from the second direction D2. The combination of the end portion 20Eb and the end portion 20Fa described above can form a shape in which the interlayer 20 is not overlapped with the corner portion CN as viewed from the second direction D2. As described above, means for preventing the interlayer 20 from being overlapped with the corner portion CN as viewed from the second direction D2 is not limited to the notched portion 25, and means for adjusting a position of an end portion of an interlayer 20 having a narrow width may be employed. Instead of the L-shape extending along two sides of the internal electrodes 11 and 13, illustrated as the interlayers 20E and 20F, a shape corresponding to one side may be employed. In this case, four sets of interlayers may be prepared.

When a direction perpendicular to the first direction and the second direction is a third direction, the dissimilar material layer may have a smaller width in at least one direction of the first direction or the third direction than those of the first internal electrode and the second internal electrode, and may be disposed on an end portion side of the first internal electrode and the second internal electrode in the one direction as viewed from the second direction. In this case, since the internal electrodes are not overlapped with the dissimilar material layer in the vicinity of the center, it is possible to reduce the expansion of the element body.

Figure 12:
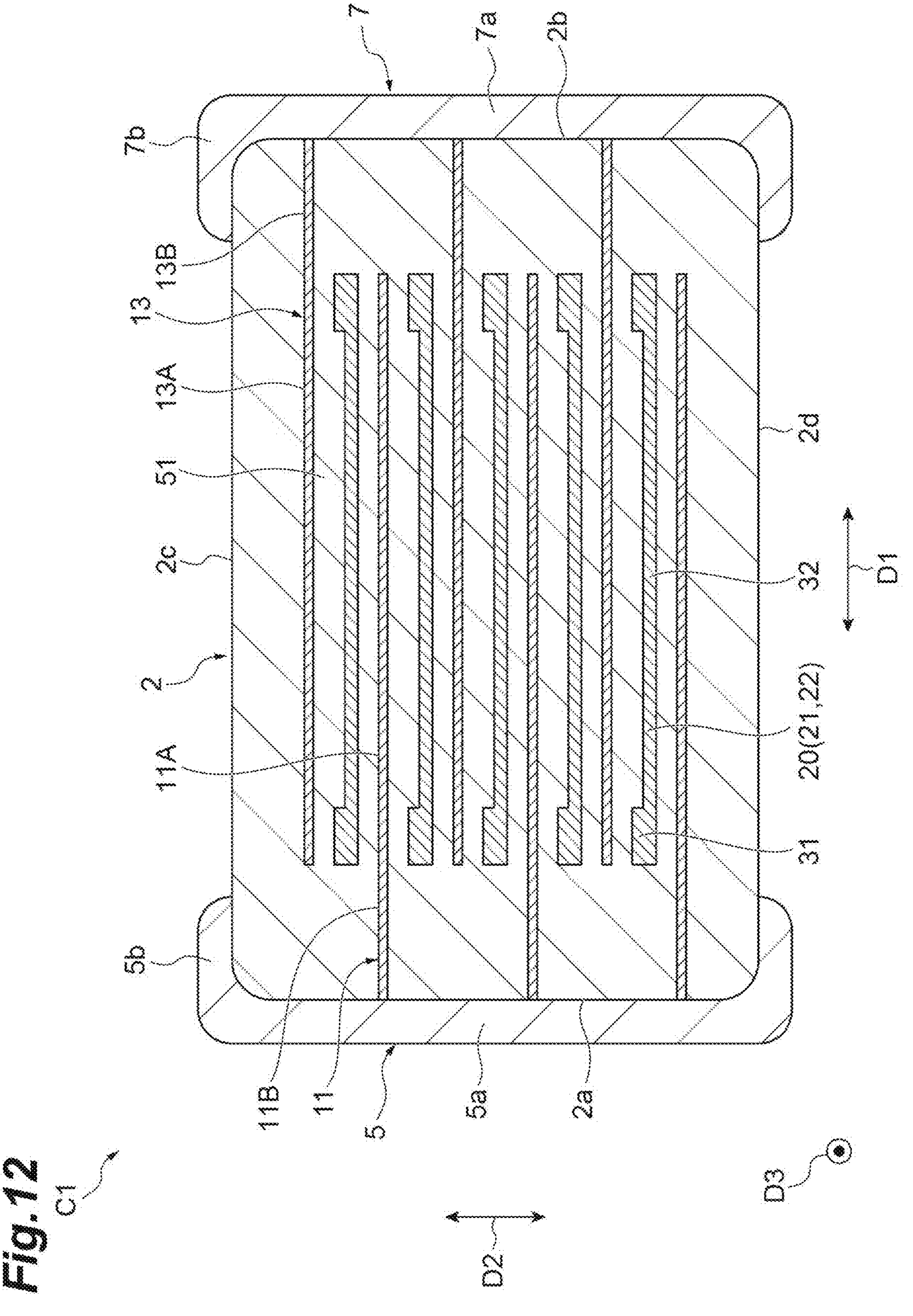
FIG. 12 is a cross-sectional view illustrating an electronic component according to a modification.
Figure 13:
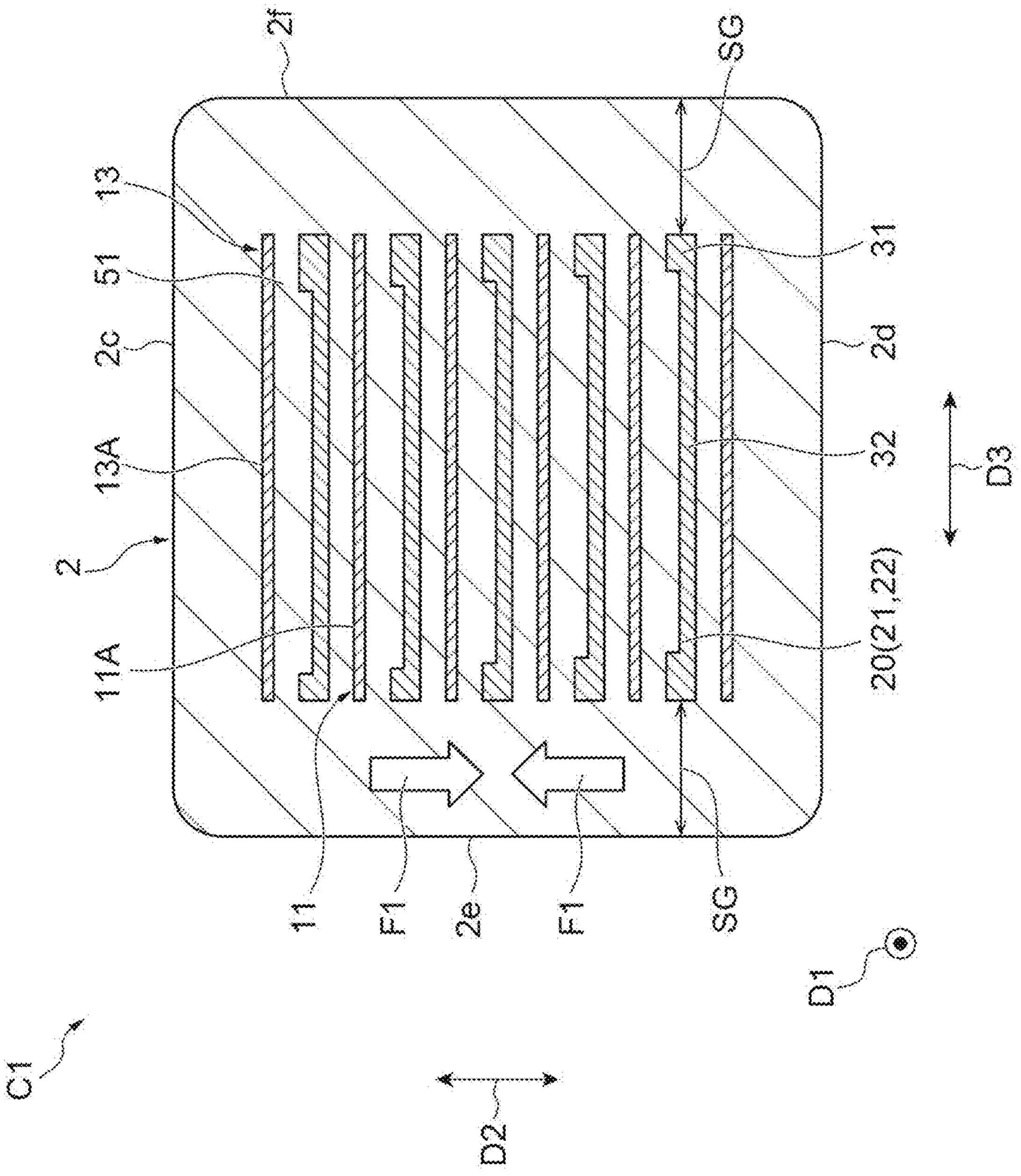
FIG. 13 is a cross-sectional view illustrating an electronic component according to a modification.

As illustrated in FIGS. 12 and 13, an edge portion 31 of the interlayer 20 on the outer peripheral side may be thicker than a region 32 on the inner peripheral side. In this case, the expansion of the element body 2 can be reduced by thinning the region 32 on the inner peripheral side. Note that the shape and size of the thinned region 32 on the inner peripheral side may be similar to those of the penetration portion 30 in FIG. 11A. The thickness of the edge portion 31 may be 1.1 times or more, more preferably 1.3 times or more the thickness of the region 32 on the inner peripheral side. In this case, the expansion of the element body can be reduced by sufficiently thinning the region on the inner peripheral side. The upper limit value of the thickness of the edge portion 31 is not particularly limited, but may be 5.0 times or less the thickness of the region 32 on the inner peripheral side.

Figure 14:
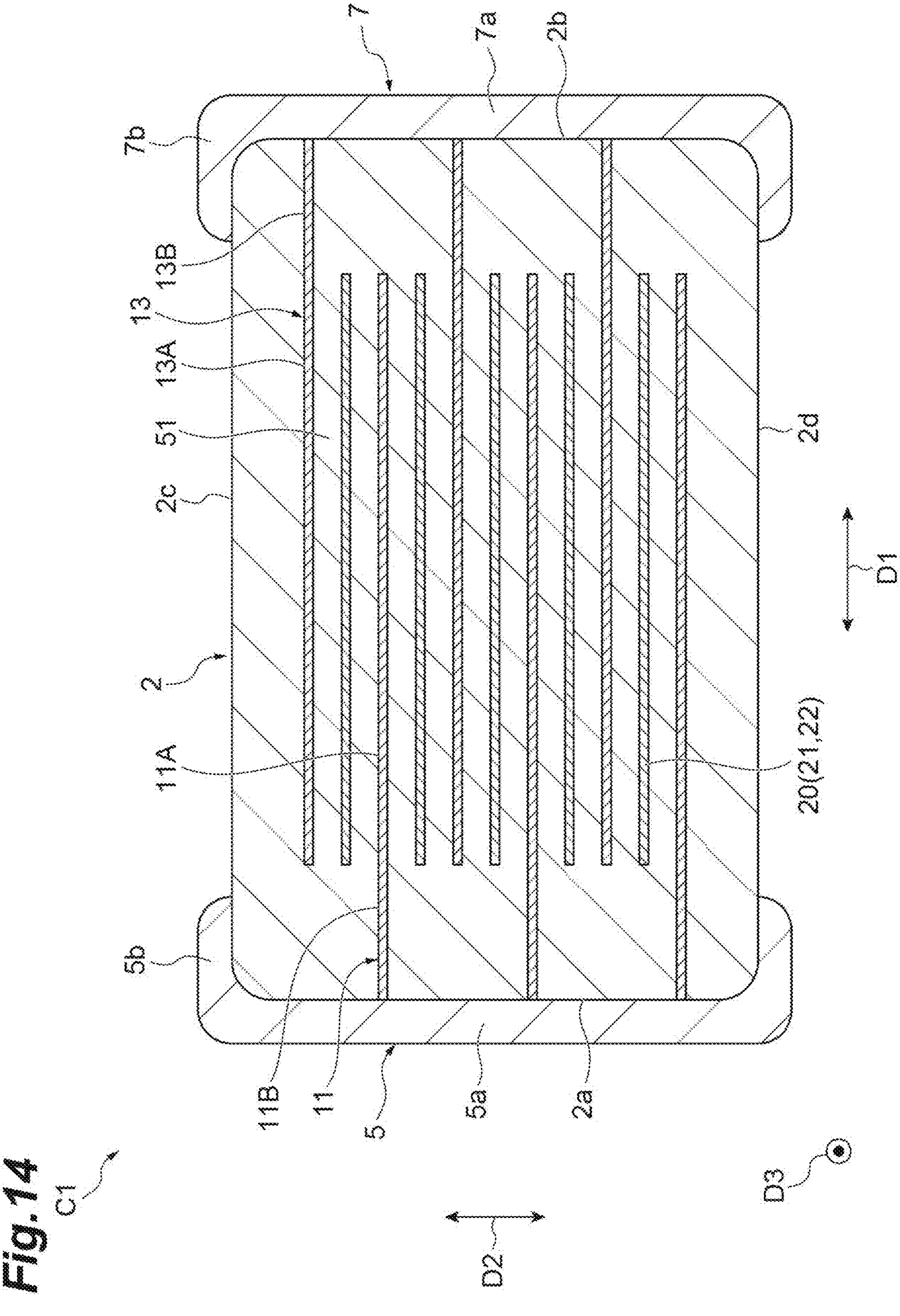
FIG. 14 is a cross-sectional view illustrating an electronic component according to a modification.
Figure 15:
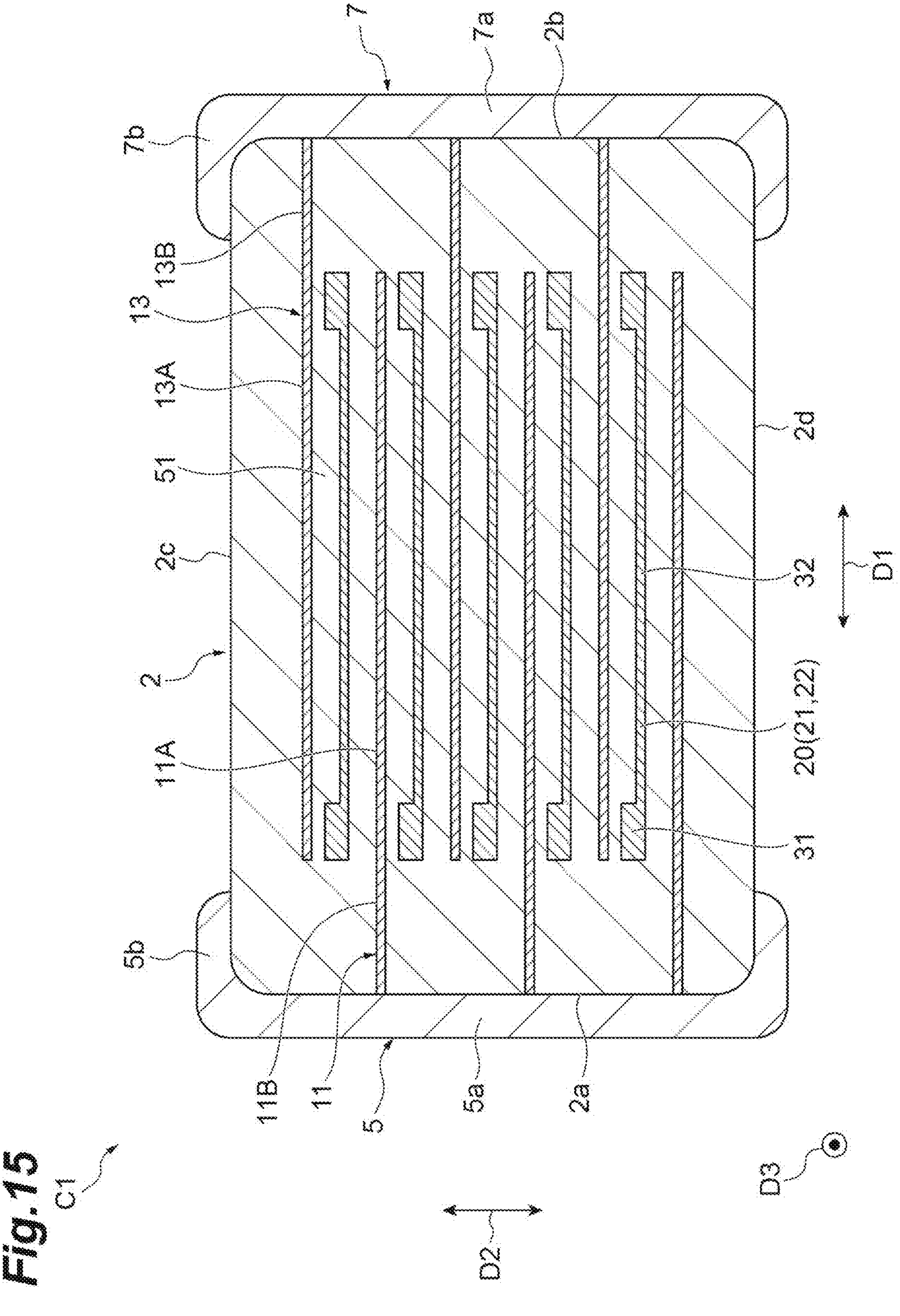
FIG. 15 is a cross-sectional view illustrating an electronic component according to a modification.

The thickness relationship between the interlayer 20 (dissimilar material layer 21) and the internal electrodes 11 and 13 is not particularly limited. For example, as illustrated in FIGS. 2 and 3, the interlayer 20 may be thicker than the internal electrodes 11 and 13, and as illustrated in FIG. 14, the interlayer 20 and the internal electrodes 11 and 13 may be equal in thickness. In addition, for example, as illustrated in FIGS. 12 and 13, the thin region 32 of the interlayer 20 may be thicker than the internal electrodes 11 and 13, and as illustrated in FIG. 15, the thin region 32 of the interlayer 20 and the internal electrodes 11 and 13 may be equal in thickness.

An experiment for confirming the effect of the electronic component of the present embodiment will be described with reference to FIGS. 16 to 19. As Example, a multilayer capacitor according to the layer configuration illustrated in FIGS. 2 to 5 was prepared. As Comparative Example 1, a multilayer capacitor with interlayers 20 removed from Example was prepared. As Comparative Example 2, a multilayer capacitor in which notched portions 25 were removed from Example, and interlayers 20 overlapped with corner portions CN of internal electrodes 11 and 13 was prepared.

Figure 16:
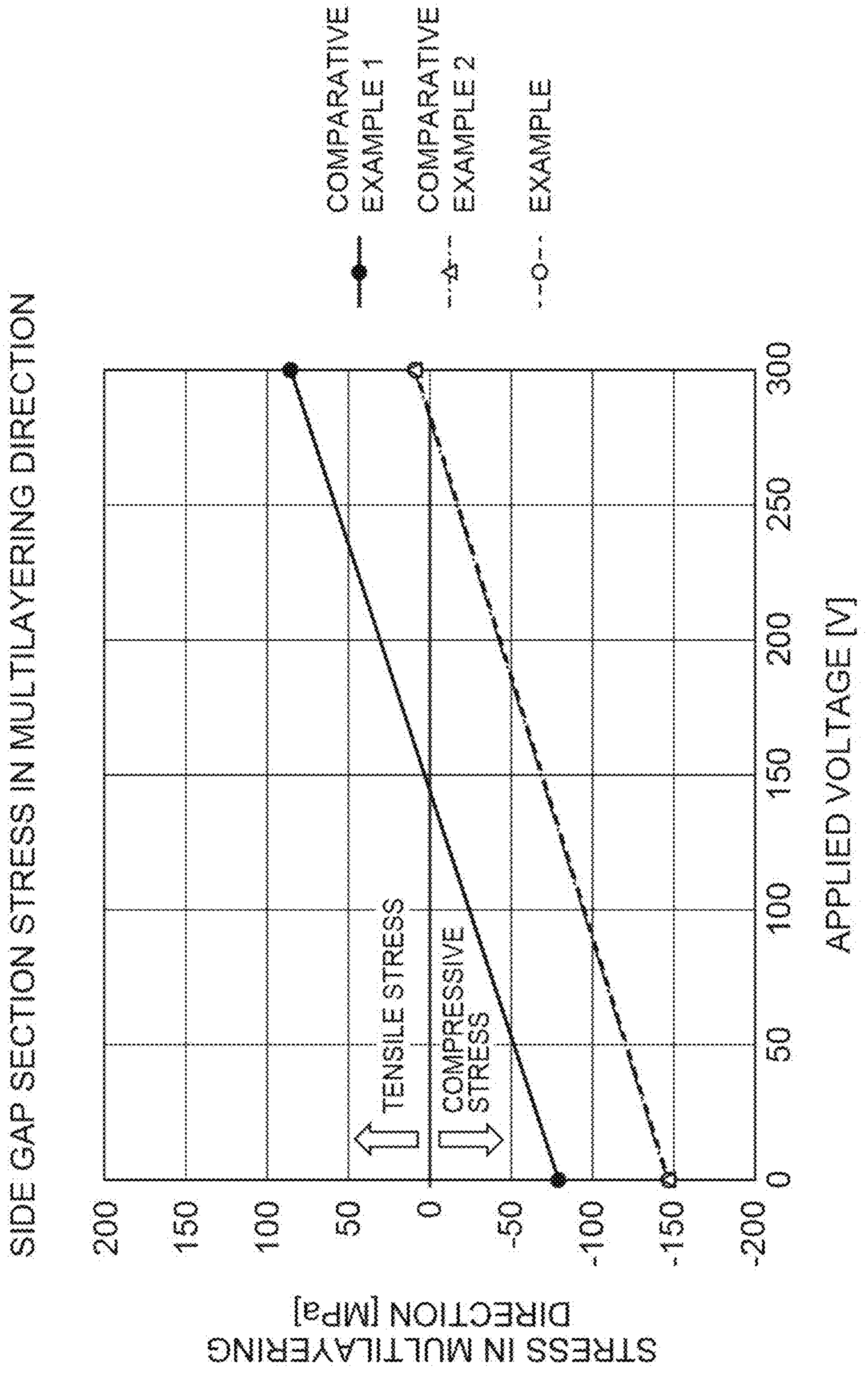
FIG. 16 is a graph illustrating an experimental result.

First, the effect of reducing cracks due to electrostriction was confirmed. A voltage was applied to Example and Comparative Examples 1 and 2, and the stress in a side gap section SG in a multilayering direction was measured. The stress at a measurement point MP1 illustrated in FIGS. 2, 3, and 4 was measured. Measurement results are illustrated in FIG. 16. As illustrated in FIG. 16, in Comparative Example 2 and Example having the interlayers 20, the compressive stress greater than that in Comparative Example 1 can be introduced even in the stage the voltage is yet applied. In Comparative Example 1, the stress acting on the side gap section SG around 150 V is a tensile stress. On the other hand, in Comparative Example 2 and Example, the stress acting on the side gap section SG up to about 300 V can be set as the compressive stress. From this fact, it was confirmed that the compressive stress could be introduced into the side gap section SG by using the interlayers 20.

Next, a voltage causing the generation of electrostrictive cracks was measured. A voltage was applied to Example and Comparative Examples 1 and 2, and a voltage when the electrostrictive cracks was generated was measured. The measurement results are illustrated in Table described in FIG. 17. As shown in Table illustrated in FIG. 17, in Comparative Example 2 and Example having the interlayers 20, the voltage causing the generation of electrostrictive cracks was higher than that in Comparative Example 1 having no interlayer 20. A T-test was performed to confirm that the difference between Comparative Example 2 and Example, and Comparative Example 1 was a statistically significant difference. From this fact, it was confirmed that the electrostrictive cracks can be reduced by using the interlayers 20.

Figure 18:
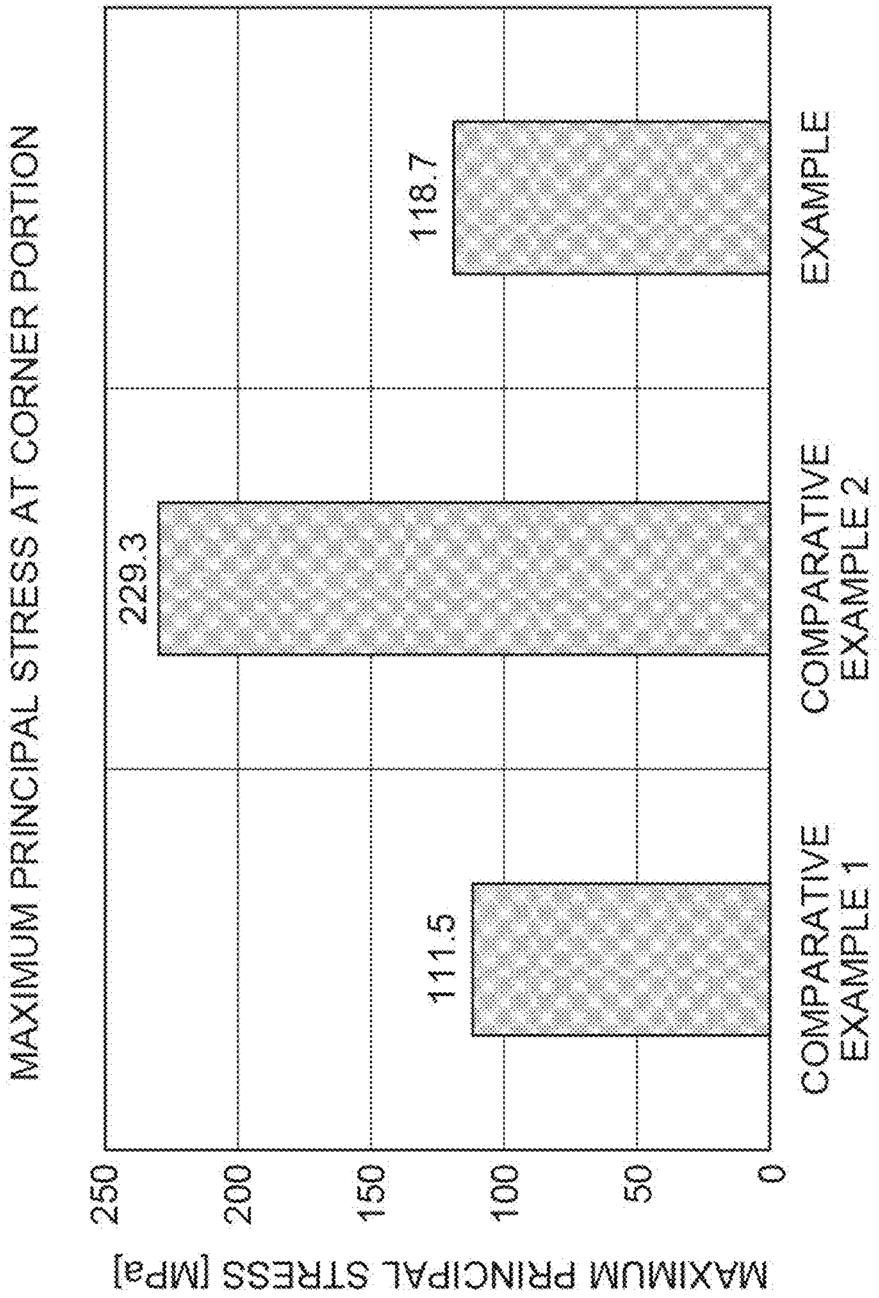
FIG. 18 is a graph illustrating an experimental result.

Next, the effect of reducing the stress in the corner portions CN by providing the notched portions 25 was confirmed. In Example and Comparative Examples 1 and 2, the stress in a corner portion CN was measured. The stress at a measurement point MP2 illustrated in FIGS. 2, 3, and 4 was measured. Measurement results are illustrated in FIG. 18. As illustrated in FIG. 18, in Comparative Example 2 having no notched portion 25, the maximum principal stress at the corner portions CN was large. On the other hand, in Example in which the notched portions 25 were provided, the maximum principal stress of the corner portions CN could be reduced to the same extent as in Comparative Example 1 without the interlayers 20. From this fact, it was confirmed that the stress at the corner portions CN could be reduced by providing the notched portions 25 so that the interlayers 20 are not overlapped with the corner portions CN.

Next, a thermal shock at 280° C. was applied to Example and Comparative Examples 1 and 2, and cracks generated were counted. Here, 20 samples were prepared, and the number of NG samples was counted.

Figure 19:
FIG. 19 is a graph illustrating the experimental result.

Measurement results are illustrated in FIG. 19. In Comparative Example 2, the NG proportion was high. On the other hand, in Example, the NG proportion could be reduced. From this fact, it was confirmed that the generation of cracks at the corner portions CN could be minimized by providing the notched portions 25 so that the interlayers 20 are not overlapped with the corner portions CN.

[Aspect 1]

An electronic component comprising:

an element body including a pair of end surfaces opposite to each other in a first direction;

a first terminal electrode disposed on one side of the pair of end surfaces in the first direction;

a second terminal electrode disposed another side of the pair of end surfaces in the first direction;

a first internal electrode disposed in the element body and connected to the first terminal electrode;

a second internal electrode disposed in the element body and connected to the second terminal electrode;

a dissimilar material layer disposed in the element body and containing a material different from the element body, wherein the first internal electrode and the second internal electrode are opposite to each other in a second direction perpendicular to the first direction with the dissimilar material layer interposed between the first internal electrode and the second internal electrode, the dissimilar material layer has a linear expansion coefficient greater than a linear expansion coefficient of the element body, the first internal electrode and the second internal electrode include corner portions positioned in the element body, and the dissimilar material layer is not overlapped with the corner portions as viewed from the second direction.

[Aspect 2]

The electronic component according to Aspect 1, wherein the element body contains a ceramic material, and the dissimilar material layer includes a metal layer.

[Aspect 3]

The electronic component according to Aspect 1 or 2, wherein, when in a region where the first internal electrode and the second internal electrode are overlapped with each other in the second direction, a dimension in a third direction perpendicular to the first direction and the second direction is denoted by W, the dimension in the third direction of a region overlapped with no dissimilar material layer in the corner portion is W/10 or more and W/3 or less.

[Aspect 4]

The electronic component according to any one of Aspects 1 to 3, wherein when in a region where the first internal electrode and the second internal electrode are overlapped with each other in the second direction, a dimension in the first direction is denoted by L, the dimension in the first direction of a region overlapped with no dissimilar material layer in the corner portion is L/10 or more and L/3 or less.

[Aspect 5]

The electronic component according to any one of Aspects 1 to 4, wherein the dissimilar material layer has a notched portion at a position corresponding to the corner portion, and the notched portion is shaped to be away from the corner portion toward an inner peripheral side as viewed from the second direction.

[Aspect 6]

The electronic component according to any one of Aspects 1 to 5, wherein the dissimilar material layer has a notched portion at a position corresponding to the corner portion, and the notched portion has a curved portion curved as viewed from the second direction.

[Aspect 7]

The electronic component according to Aspect 6, wherein the curved portion is curved in such a manner as to be away from the corner portion toward an inner peripheral side as viewed from the second direction.

[Aspect 8]

The electronic component according to any one of Aspects 1 to 7, wherein the corner portion has a shape protruding toward an outer peripheral side.

[Aspect 9]

The electronic component according to any one of Aspects 1 to 8, wherein a thickness of the dissimilar material layer is greater than thicknesses of the first internal electrode and the second internal electrode.

[Aspect 10]

The electronic component according to Aspect 9, wherein the thickness of the dissimilar material layer is 1.3 times or more the thicknesses of the first internal electrode and the second internal electrode.

[Aspect 11]

The electronic component according to any one of Aspects 1 to 10, wherein an edge portion on an outer peripheral side of the dissimilar material is thicker than a region on an inner peripheral side.

[Aspect 12]

The electronic component according to Aspect 11, wherein a thickness of the edge portion is 1.3 times or more a thickness of the region on the inner peripheral side.

[Aspect 13]

The electronic component according to any one of Aspect 1 to 12, wherein, when a direction perpendicular to the first direction and the second direction is a third direction, the dissimilar material layer has a smaller width in at least one direction of the first direction or the third direction than those of the first internal electrode and the second internal electrode, and the dissimilar material layer is disposed on an end portion side of the first internal electrode and the second internal electrode in the at least one direction as viewed from the second direction.

[Aspect 14]

An electronic component comprising:

an element body including a pair of end surfaces opposite to each other in a first direction;

a first terminal electrode disposed on one side of the pair of end surfaces in the first direction;

a second terminal electrode disposed another side of the pair of end surfaces in the first direction;

a first internal electrode disposed in the element body and connected to the first terminal electrode;

a second internal electrode disposed in the element body and connected to the second terminal electrode;

a compressive stress introduction layer disposed in the element body and configured to introduce a compressive stress into the element body, wherein the first internal electrode and the second internal electrode are opposite to each other in a second direction perpendicular to the first direction with the compressive stress introduction layer interposed between the first internal electrode and the second internal electrode, the compressive stress introduction layer is configured to introduce the compressive stress into a side gap section between the first internal electrode and the second internal electrode, and a side surface of the element body in a third direction perpendicular to the first direction and the second direction, the first internal electrode and the second internal electrode include corner portions positioned in the element body, and the compressive stress introduction layer is not overlapped with the corner portions as viewed from the second direction.

REFERENCE SIGNS LIST

2 Element body
5 First terminal electrode
7 Second terminal electrode
11 First internal electrode
13 Second internal electrode
21 Dissimilar material layer
22 Compressive stress introduction layer
25 Notched portion
26 Edge portion
27 Curved portion
C1 Multilayer capacitor (electronic component)

What is claimed is:

1. An electronic component comprising:

an element body including a pair of end surfaces opposite to each other in a first direction;

a first terminal electrode disposed on one side of the pair of end surfaces in the first direction;

a second terminal electrode disposed another side of the pair of end surfaces in the first direction;

a first internal electrode disposed in the element body and connected to the first terminal electrode;

a second internal electrode disposed in the element body and connected to the second terminal electrode;

a dissimilar material layer disposed in the element body and containing a material different from the element body, wherein the first internal electrode and the second internal electrode are opposite to each other in a second direction perpendicular to the first direction with the dissimilar material layer interposed between the first internal electrode and the second internal electrode, the dissimilar material layer has a linear expansion coefficient greater than a linear expansion coefficient of the element body, the first internal electrode and the second internal electrode include corner portions positioned in the element body, and the dissimilar material layer is not overlapped with the corner portions as viewed from the second direction.

2. The electronic component according to claim 1, wherein the element body contains a ceramic material, and the dissimilar material layer includes a metal layer.

3. The electronic component according to claim 1, wherein, when in a region where the first internal electrode and the second internal electrode are overlapped with each other in the second direction, a dimension in a third direction perpendicular to the first direction and the second direction is denoted by W, the dimension in the third direction of a region overlapped with no dissimilar material layer in the corner portion is W/10 or more and W/3 or less.

4. The electronic component according to claim 1, wherein, when in a region where the first internal electrode and the second internal electrode are overlapped with each other in the second direction, a dimension in the first direction is denoted by L, the dimension in the first direction of a region overlapped with no dissimilar material layer in the corner portion is L/10 or more and L/3 or less.

5. The electronic component according to claim 1, wherein the dissimilar material layer has a notched portion at a position corresponding to the corner portion, and the notched portion is shaped to be away from the corner portion toward an inner peripheral side as viewed from the second direction.

6. The electronic component according to claim 1, wherein the dissimilar material layer has a notched portion at a position corresponding to the corner portion, and the notched portion has a curved portion curved as viewed from the second direction.

7. The electronic component according to claim 6, wherein the curved portion is curved in such a manner as to be away from the corner portion toward an inner peripheral side as viewed from the second direction.

8. The electronic component according to claim 1, wherein the corner portion has a shape protruding toward an outer peripheral side.

9. The electronic component according to claim 1, wherein a thickness of the dissimilar material layer is greater than thicknesses of the first internal electrode and the second internal electrode.

10. The electronic component according to claim 9, wherein the thickness of the dissimilar material layer is 1.3 times or more the thicknesses of the first internal electrode and the second internal electrode.

11. The electronic component according to claim 1, wherein an edge portion on an outer peripheral side of the dissimilar material is thicker than a region on an inner peripheral side.

12. The electronic component according to claim 11, wherein a thickness of the edge portion is 1.3 times or more a thickness of the region on the inner peripheral side.

13. The electronic component according to claim 1, wherein, when a direction perpendicular to the first direction and the second direction is a third direction, the dissimilar material layer has a smaller width in at least one direction of the first direction or the third direction than those of the first internal electrode and the second internal electrode, and the dissimilar material layer is disposed on an end portion side of the first internal electrode and the second internal electrode in the at least one direction as viewed from the second direction.

14. An electronic component comprising:

an element body including a pair of end surfaces opposite to each other in a first direction;

a first terminal electrode disposed on one side of the pair of end surfaces in the first direction;

a second terminal electrode disposed another side of the pair of end surfaces in the first direction;

a first internal electrode disposed in the element body and connected to the first terminal electrode;

a second internal electrode disposed in the element body and connected to the second terminal electrode;

a compressive stress introduction layer disposed in the element body and configured to introduce a compressive stress into the element body, wherein the first internal electrode and the second internal electrode are opposite to each other in a second direction perpendicular to the first direction with the compressive stress introduction layer interposed between the first internal electrode and the second internal electrode, the compressive stress introduction layer is configured to introduce the compressive stress into a side gap section between the first internal electrode and the second internal electrode, and a side surface of the element body in a third direction perpendicular to the first direction and the second direction, the first internal electrode and the second internal electrode include corner portions positioned in the element body, and the compressive stress introduction layer is not overlapped with the corner portions as viewed from the second direction.

* * * * *